United States Patent
Chen et al.

(10) Patent No.: US 11,841,448 B2
(45) Date of Patent: Dec. 12, 2023

(54) COMPOSITE TENSOR BEAMFORMING METHOD FOR ELECTROMAGNETIC VECTOR COPRIME PLANAR ARRAY

(71) Applicant: Zhejiang University, Zhejiang (CN)

(72) Inventors: Jiming Chen, Zhejiang (CN); Zhiguo Shi, Zhejiang (CN); Hang Zheng, Zhejiang (CN); Chengwei Zhou, Zhejiang (CN)

(73) Assignee: Zhejiang University, Zhejiang (CN)

( * ) Notice: Subject to any disclaimer, the term of this patent is extended or adjusted under 35 U.S.C. 154(b) by 175 days.

(21) Appl. No.: 17/439,813

(22) PCT Filed: Dec. 16, 2020

(86) PCT No.: PCT/CN2020/136694
§ 371 (c)(1),
(2) Date: Sep. 16, 2021

(87) PCT Pub. No.: WO2022/126408
PCT Pub. Date: Jun. 23, 2022

(65) Prior Publication Data
US 2023/0048116 A1    Feb. 16, 2023

(51) Int. Cl.
*G01S 5/04* (2006.01)
*G01S 3/14* (2006.01)
(Continued)

(52) U.S. Cl.
CPC ............. *G01S 3/143* (2013.01); *H01Q 3/26* (2013.01); *G01S 3/00* (2013.01); *H01Q 21/061* (2013.01)

(58) Field of Classification Search
CPC .. G01S 3/143; G01S 3/13; G01S 3/00; H01Q 3/26; H01Q 21/061
(Continued)

(56) References Cited

U.S. PATENT DOCUMENTS

| | | | |
|---|---|---|---|
| 11,567,161 B2 * | 1/2023 | Zhou | G01S 3/14 |
| 2003/0058153 A1 * | 3/2003 | Yu | G01S 7/2813 |
| | | | 342/147 |
| 2019/0260124 A1 * | 8/2019 | Davoyan | H01Q 1/3233 |

FOREIGN PATENT DOCUMENTS

| | | | | |
|---|---|---|---|---|
| CN | 105785347 | | 7/2016 | |
| CN | 107045131 A | * | 8/2017 | G01S 19/21 |

(Continued)

OTHER PUBLICATIONS

Yang Liu, et al., "Spatial Spectral Estimation Using a Coprime Sensor Array With the Min Processor", IEEE Sensor Array and Multichannel Signal Processing Workshop (SAM), Sep. 19, 2016, pp. 1-5.

(Continued)

*Primary Examiner* — Chuong P Nguyen
(74) *Attorney, Agent, or Firm* — JCIP GLOBAL INC.

(57) ABSTRACT

The present invention belongs to the field of array signal processing and relates to a composite tensor beamforming method for an electromagnetic vector coprime planar array. The method includes: building an electromagnetic vector coprime planar array; performing tensor modeling of an electromagnetic vector coprime planar array receiving signal; designing a three-dimensional weight tensor corresponding to a coprime sparse uniform sub-planar array; forming a tensor beam power pattern of the coprime sparse uniform sub-planar array; and performing electromagnetic vector coprime planar array tensor beamforming based on coprime composite processing of the sparse uniform sub-planar array. Starting from the principles of receiving signal tensor spatial filtering of two sparse uniform sub-planar arrays that compose the electromagnetic vector coprime (Continued)

planar array, the present invention forms a coprime composite processing method based on a sparse uniform sub-planar array output signal.

8 Claims, 4 Drawing Sheets

(51) Int. Cl.
 *H01Q 3/26* (2006.01)
 *H01Q 21/06* (2006.01)
 *G01S 3/00* (2006.01)

(58) Field of Classification Search
 USPC .......................................................... 342/455
 See application file for complete search history.

(56) References Cited

FOREIGN PATENT DOCUMENTS

| | | | | |
|---|---|---|---|---|
| CN | 107302391 | | 10/2017 | |
| CN | 108344967 | | 7/2018 | |
| CN | 112710983 A | * | 4/2021 | ............. G01S 3/143 |
| CN | 112711000 A | * | 4/2021 | ............. G01S 7/418 |
| CN | 109557502 B | * | 9/2022 | ............. G01S 13/02 |
| WO | WO-2022151511 A1 | * | 7/2022 | ............. G01S 3/143 |

OTHER PUBLICATIONS

Gui Yufeng, et al., "Two-dimensional coprime vector-sensor array signal processing based on tensor decompositions", Journal of Nanchang Institute of Technology, vol. 38, No. 4, Aug. 31, 2019, pp. 83-91.

* cited by examiner

COMPOSITE TENSOR BEAMFORMING METHOD FOR ELECTROMAGNETIC VECTOR COPRIME PLANAR ARRAY

CROSS-REFERENCE TO RELATED APPLICATION

This application is a 371 of international application of PCT application serial no. PCT/CN2020/136694, filed on Dec. 16, 2020. The entirety of each of the above mentioned patent applications is hereby incorporated by reference herein and made a part of this specification.

FIELD OF TECHNOLOGY

The present invention belongs to the field of array signal processing and relates to a spatial filtering technique of multi-dimensional spare array receiving signal, specifically a composite tensor beamforming method for an electromagnetic vector coprime planar array.

BACKGROUND

Beamforming is widely applied to such fields as radar, radio astronomy, medical imaging and 5G communication as one of key techniques for array signal processing. When software and hardware resources are limited, as compared with a conventional uniform array, a spare array has a larger array hole diameter and a higher spatial resolution, thereby realizing capability of forming a more advanced beam directivity, wherein a coprime array is a cutting-edge hot issue of research in the current academic world as a typical systemic sparse array architecture. On the other hand, in order to satisfy requirements of spatial signal polarized information for a complicated signal detection scene, as compared with a conventional scalar sensor array, an electromagnetic vector sensor can simultaneously sense a Direction of Arrival (DOA) and polarized state information of a desired signal, thereby realizing spatial filtering simultaneously in the DOA and a polarized state corresponding to the desired signal. In this regard, it is desired to realize a breakthrough in performance of related application fields by exploring an effective beamforming measure on a new form array architecture integrated with the electromagnetic vector sensor and a coprime planar array. However, it is still at a starting stage for research of a current beamforming method for an electromagnetic vector coprime planar array. Since a receiving signal of the electromagnetic vector coprime planar array covers multi-dimensional space information, a conventional measure of processing and analyzing a vector receiving signal will cause a damage to original structural information thereof.

A tensor has been widely applied in multiple fields like array signal processing, image processing and machine learning in the recent years as a multi-dimensional data model for modeling and analysis of a multi-dimensional signal, thus effectively reserving original structural information of the multi-dimensional signal and digging multi-dimensional spatial features thereof. In the field of array signal processing, promoting a conventional beamforming method based on vector signal processing in a tensor space is desirable to realize efficient spatial filtering for a multi-dimensional receiving signal. However, the design of the beamforming method for an electromagnetic vector coprime planar array is confronted with the following difficulties: on one hand, since a multi-dimensional receiving signal of the electromagnetic vector coprime planar array simultaneously covers a DOA and polarized state information, it is necessary to match its complicated space information structure and design an adaptive high-dimension tensor beamforming weight; on the other hand, since sparse arrangement of elements in the electromagnetic vector coprime planar array does not satisfy a Nyquist sampling rate, an imported virtual peak causes series loss to output performance of beamforming. Therefore, it is necessary to effectively restrain the virtual peak to improve output performance of beamforming. Therefore, it is still a hot and difficult problem needing to be solved urgently concerning how to simultaneously match a multi-dimensional receiving signal structure and a sparse arrangement feature of an array for the electromagnetic vector coprime planar array, thereby realizing tensor beamforming with a virtual peak restraining capability.

SUMMARY

In order to solve the technical problem of multi-dimensional signal structure information loss and virtual peak interference existing in the prior art, the present invention proposes a composite tensor beamforming method for an electromagnetic vector coprime planar array, with a specific technical solution thereof as follows:

A composite tensor beamforming method for an electromagnetic vector coprime planar array comprises:

step 1: building an electromagnetic vector coprime planar array;

step 2: performing tensor modeling of an electromagnetic vector coprime planar array receiving signal;

step 3: designing a three-dimensional weight tensor corresponding to a coprime sparse uniform sub-planar array;

step 4: forming a tensor beam power pattern of the coprime sparse uniform sub-planar array; and step 5: performing electromagnetic vector coprime planar array tensor beamforming based on coprime composite processing of the sparse uniform sub-planar array.

Further, the step 1 specifically includes:

structuring a pair of sparse uniform sub-planar arrays $\mathbb{P}_1$ and $\mathbb{P}_2$ on a plane coordinate system xoy of a receiving end, $\mathbb{P}_1$ and $\mathbb{P}_2$ respectively comprising $M_{\mathbb{P}_1} \times N_{\mathbb{P}_1}$ and $M_{\mathbb{P}_2} \times N_{\mathbb{P}_2}$ antenna elements, wherein $M_{\mathbb{P}_1}$, $M_{\mathbb{P}_2}$ and $N_{\mathbb{P}_1}$, $N_{\mathbb{P}_2}$ are respectively a pair of coprime integers; intervals of antenna elements of the sparse uniform sub-planar array $\mathbb{P}_1$ in x axis and y axis directions being respectively $M_{\mathbb{P}_2}d$ and $N_{\mathbb{P}_2}d$, wherein a unit interval is $d=\lambda/2$, and $\lambda$ denotes a signal wavelength; similarly, intervals of the antenna elements of the sparse uniform sub-planar array $\mathbb{P}_2$ in x axis and y axis directions being respectively $M_{\mathbb{P}_1}d$ and $N_{\mathbb{P}_1}d$, wherein in $\mathbb{P}_1$, positions of the $(m_{\mathbb{P}_1}, n_{\mathbb{P}_1})^{th}$ antenna element in x axis and y axis directions are respectively $$x_{\mathbb{P}_1}^{(m_{\mathbb{P}_1})} = (m_{\mathbb{P}_1} - 1)M_{\mathbb{P}_2}d \text{ and } y_{\mathbb{P}_1}^{(n_{\mathbb{P}_1})} = (n_{\mathbb{P}_1} - 1)N_{\mathbb{P}_2}d,$$

wherein $m_{\mathbb{P}_1} = 1, 2, \ldots, M_{\mathbb{P}_1}$, $n_{\mathbb{P}_1} = 1, 2, \ldots, N_{\mathbb{P}_1}$; in $\mathbb{P}_2$, positions of the $(m_{\mathbb{P}_2}, n_{\mathbb{P}_1})^{th}$ antenna element in x axis and y axis directions are respectively $$x_{\mathbb{P}_2}^{(m_{\mathbb{P}_2})} = (m_{\mathbb{P}_2} - 1)M_{\mathbb{P}_1}d \text{ and } y_{\mathbb{P}_2}^{(n_{\mathbb{P}_2})} = (n_{\mathbb{P}_2} - 1)N_{\mathbb{P}_1}d,$$

wherein $m_{\mathbb{P}_2}=1, 2, \ldots, M_{\mathbb{P}_2}$, $n_{\mathbb{P}_2}=1, 2, \ldots, N_{\mathbb{P}_2}$; and combining sub-arrays in a manner of superimposing elements ($x_{\mathbb{P}_1}^{(1)} = x_{\mathbb{P}_2}^{(1)} = y_{\mathbb{P}_1}^{(1)} = y_{\mathbb{P}_2}^{(1)} = 0$) at a position of an origin point of the coordinate system for $\mathbb{P}_1$ and $\mathbb{P}_2$, thereby obtaining an electromagnetic vector coprime planar array actually comprising $M_{\mathbb{P}_1}N_{\mathbb{P}_1}+M_{\mathbb{P}_2}N_{\mathbb{P}_2}-1$ antenna elements, wherein each of the antenna elements uses three mutually orthogonal electric doublets and three mutually orthogonal magnetic dipoles to realize sensing of electromagnetic field, thereby possessing a six-path output.

Further, the step 2 specifically comprises:

setting a far-field narrow-band desired signal that is incident to the electromagnetic vector coprime planar array from a ($\theta$, $\varphi$) direction, wherein $\theta$ and $\varphi$ respectively denote an azimuth angle and a pitch angle of the desired signal and $\theta\in[-\pi/2, \pi/2]$, $\varphi\in[-\pi, \pi]$; the six-path output of each of the elements in the electromagnetic vector coprime planar array simultaneously comprises Direction of Arrival (DOA) information $U(\theta, \varphi)\in\mathbb{C}^{6\times 2}$ and polarized state information $g(\gamma, \eta)\in\mathbb{C}^2$, wherein $\gamma\in[0, 2\pi]$ and $\eta\in[-\pi, \pi]$ respectively denote a polarized auxiliary angle and a polarized phase difference, and a DOA matrix $U(\theta, \varphi)$ and a polarized state vector $g(\gamma, \eta)$ are specifically defined as:

$$U(\theta, \varphi) = \begin{bmatrix} -\sin\theta & \cos\varphi\cos\theta \\ \cos\theta & \cos\varphi\sin\theta \\ 0 & -\sin\varphi \\ \cos\varphi\cos\theta & \sin\theta \\ \cos\varphi\sin\theta & -\cos\theta \\ -\sin\varphi & 0 \end{bmatrix},$$

$$g(\gamma, \eta) = \begin{bmatrix} \cos\gamma \\ \sin\gamma e^{j\eta} \end{bmatrix},$$

wherein $j=\sqrt{-1}$, and correspondingly, output of each of the elements in the electromagnetic vector coprime planar array is denoted with a spatial electromagnetic response vector $p\in\mathbb{C}^6$ as follows:

$$p=U(\theta,\varphi)g(\gamma,\eta).$$

when G non-relevant interfering signals exist simultaneously in a space, the DOA matrix, the polarized state vector and the spatial electromagnetic response vector thereof are respectively denoted by $\overline{U}(\overline{\theta}_g, \overline{\varphi}_g)$, $\overline{g}(\overline{\gamma}_g, \overline{\eta}_g)$ and $\overline{p}_g=\overline{U}(\overline{\theta}_g, \overline{\varphi}_g)\overline{g}(\overline{\gamma}_g, \overline{\eta}_g)$, wherein $g=1, 2, \ldots, G$;

reserving three-dimensional spatial information of a receiving signal of the sparse uniform sub-planar array $\mathbb{P}_i$ ($i=1, 2$) at time t, i.e. DOA information and spatial electromagnetic response information in x axis direction and y axis direction, which are denoted with one three-dimensional tensor, and superimposing a three-dimensional signal tensor snapped by the collected T sampling blocks on a time dimension as a fourth dimension, thereby constituting a receiving signal tensor $$\mathcal{X}_{\mathbb{P}_i} \in \mathbb{C}^{M_{\mathbb{P}_i}\times N_{\mathbb{P}_i}\times 6\times T}$$

corresponding to the sparse uniform sub-planar array $\mathbb{P}_i$, the receiving signal tensor $$\mathcal{X}_{\mathbb{P}_i} \in \mathbb{C}^{M_{\mathbb{P}_i}\times N_{\mathbb{P}_i}\times 6\times T}$$

being denoted as follows:

$$\mathcal{X}_{\mathbb{P}_i} = a_x^{(\mathbb{P}_i)}\circ a_y^{(\mathbb{P}_i)}\circ p\circ s + \sum_{g=1}^{G} \overline{a}_{xg}^{(\mathbb{P}_i)}\circ \overline{a}_{yg}^{(\mathbb{P}_i)}\circ \overline{p}_g\circ \overline{s}_g + \mathcal{N}_{\mathbb{P}_i},$$

wherein $a_x^{(\mathbb{P}_i)} = \left[1, e^{-j\frac{2\pi}{\lambda}x_{\mathbb{P}_i}^{(2)}\mu}, \ldots, e^{-j\frac{2\pi}{\lambda}x_{\mathbb{P}_i}^{(M_{\mathbb{P}_i})}\mu}\right]^T \in \mathbb{C}^{M_{\mathbb{P}_i}}$ and $a_y^{(\mathbb{P}_i)} =$ $$\left[1, e^{-j\frac{2\pi}{\lambda}y_{\mathbb{P}_i}^{(2)}\upsilon}, \ldots, e^{-j\frac{2\pi}{\lambda}y_{\mathbb{P}_i}^{(N_{\mathbb{P}_i})}\upsilon}\right]^T \in \mathbb{C}^{N_{\mathbb{P}_i}}$$

respectively denote a desired signal guiding vector of the electromagnetic vector coprime planar array in x axis and y axis directions, and $\mu=\sin\varphi\cos\theta$ and $\upsilon=\sin\varphi\sin\theta$, $s=[s(1), s(2), \ldots, s(T)]^T\in\mathbb{C}^T$ is a signal waveform of the desired signal, $\circ$ denotes an outer product of vectors, $(\bullet)^T$ denotes an transposition operation, and $$\mathcal{N}_{\mathbb{P}_i} \in \mathbb{C}^{M_{\mathbb{P}_i}\times N_{\mathbb{P}_i}\times 6\times T}$$

is an independent co-distributed additive white Gaussian noise tensor; and then $$\overline{a}_{xg}^{(\mathbb{P}_i)} \in \mathbb{C}^{M_{\mathbb{P}_i}} \text{ and } \overline{a}_{yg}^{(\mathbb{P}_i)} \in \mathbb{C}^{N_{\mathbb{P}_i}}$$

respectively denote guiding vectors of the electromagnetic vector coprime planar array in x axis and y axis directions, corresponding to the $g^{th}$ interfering signal, and $\overline{s}_g\in\mathbb{C}^T$ denotes a signal waveform of the $g^{th}$ interfering signal.

Further, the step 3 specifically includes:

for a receiving signal tensor $$\mathcal{X}_{\mathbb{P}_i}(t) \in \mathbb{C}^{M_{\mathbb{P}_i}\times N_{\mathbb{P}_i}\times 6}$$

of two sparse uniform sub-planar arrays that compose the electromagnetic vector coprime planar array at time t, setting a three-dimensional weight tensor $$\mathcal{W}_{\mathbb{P}_i} \in \mathbb{C}^{M_{\mathbb{P}_i}\times N_{\mathbb{P}_i}\times 6}$$

matching multi-dimensional structure information thereof, performing spatial filtering on $\mathcal{X}_{\mathbb{P}_i}(t)$ through $\mathcal{W}_{\mathbb{P}_i}$, and forming a beam directivity in the DOA corresponding to the desired signal, thereby obtaining an output signal $y_{\mathbb{P}_i}(t)$, which is denoted as follows:

$$y_{\mathbb{P}_i(t)}=<\mathcal{X}_{\mathbb{P}_i(t)}, \mathcal{W}_{\mathbb{P}_i}^*>, t=1,2,\ldots,T,$$

wherein $<\bullet>$ denotes an inner product of tensors, $(\bullet)^*$ denotes a conjugation operation; then minimizing an average output power of a tensor beamformer and performing optimization processing such that the DOA of the desired signal and a response corresponding to a polarized state thereof should not be distorted, thereby obtaining a tensor beamformer $\mathcal{W}_{\mathbb{P}_i}$ corresponding to two sparse uniform sub-planar arrays, the optimization processing expression being as follows:

$$\min_{\mathcal{W}_{\mathbb{P}_i}} E\left[|y_{\mathbb{P}_i}(t)|^2\right]$$

-continued s.t. $<\mathcal{W}_{\mathbb{P}_i}^*, c\mathcal{A}_{\mathbb{P}_i}(\theta, \varphi, \gamma, \eta)> = 1$, wherein $c\mathcal{A}_{\mathbb{P}_i}(\theta, \varphi, \gamma, \eta) = a_x^{(\mathbb{P}_i)} \circ a_y^{(\mathbb{P}_i)} \circ p \in \mathbb{C}^{M_{\mathbb{P}_i} \times N_{\mathbb{P}_i} \times 6}$ denotes a three-dimensional space manifold tensor of the sparse uniform sub-planar array $\mathbb{P}_i$ corresponding to a DOA ($\theta$, $\varphi$) and a polarized state ($\gamma$, $\eta$) of a desired signal, |•| denotes a modulo operation of complex number, and E[•] denotes an expectation-taking operation; through solving, three-dimensional weight tensors $\mathcal{W}_{\mathbb{P}_1}$ and $\mathcal{W}_{\mathbb{P}_2}$ respectively corresponding to sparse uniform sub-planar arrays $\mathbb{P}_1$ and $\mathbb{P}_2$ are obtained and output signals $y_{\mathbb{P}_1}(t)$ and $y_{\mathbb{P}_2}(t)$ are generated;

wherein each space dimension information of the three-dimensional weight tensors $\mathcal{W}_{\mathbb{P}_i}$ and $\mathcal{X}_{\mathbb{P}_i}(t)$ corresponds to each other, $\mathcal{W}_i$ decomposed in a manner of CANDE-COMP/PARAFAC is denoted as an outer product of a beamforming weight vector corresponding to DOA information $w_1^{(\mathbb{P}_i)} \in \mathbb{C}^{M_{\mathbb{P}_i}}$ in x axis, DOA information $w_2^{(\mathbb{P}_i)} \in \mathbb{C}^{N_{\mathbb{P}_i}}$ in y axis and spatial electromagnetic response information $w_3^{(\mathbb{P}_i)} \in \mathbb{C}^6$:

$\mathcal{W}_{\mathbb{P}_i} = w_1^{(\mathbb{P}_i)} \circ w_2^{(\mathbb{P}_i)} \circ w_3^{(\mathbb{P}_i)}$, then, an output signal $y_{\mathbb{P}_i}(t)$ of the sparse uniform sub-planar array $\mathbb{P}_i$ at time t can be denoted as follows:

$y_{\mathbb{P}_i}(t) = \mathcal{X}_{\mathbb{P}_i}(t) \times_1 w_1^{(\mathbb{P}_i)^*} \times_2 w_2^{(\mathbb{P}_i)^*} \times_3 w_3^{(\mathbb{P}_i)^*}$, wherein $\times_r$ denotes an inner product of a tensor and a matrix along the $r^{th}$ dimension;

a weight tensor $\mathcal{W}_{\mathbb{P}_i}$ corresponding to a receiving signal tensor $\mathcal{X}_{\mathbb{P}_i}(t)$ is weighted to be equivalently denoted as multi-dimensional weight of the above three beamforming weight vector $w_r^{(\mathbb{P}_i)}$, r=1, 2, 3, for $\mathcal{X}_{\mathbb{P}_i}(t)$, and a corresponding optimization problem can be denoted as follows:

$$\min_{w_r^{(\mathbb{P}_i)}(r=1,2,3)} w_r^{(\mathbb{P}_i)^H} R_r^{(\mathbb{P}_i)} w_r^{(\mathbb{P}_i)}$$

s.t. $w_1^{(\mathbb{P}_i)^H} a_x^{(\mathbb{P}_i)} = 1$, $w_2^{(\mathbb{P}_i)^H} a_y^{(\mathbb{P}_i)} = 1$, $w_3^{(\mathbb{P}_i)^H} p = 1$, wherein $$R_r^{(\mathbb{P}_i)} = E\left[x_r^{(\mathbb{P}_i)}(t)\left(x_r^{(\mathbb{P}_i)}(t)\right)^H\right], x_r^{(\mathbb{P}_i)}$$

denotes an output signal of the sparse uniform sub-planar array $\mathbb{P}_i$ at the $r^{th}$ dimension, and a beamforming weight vector of remaining two dimensions other than the $r^{th}$ dimension is obtained after $\mathcal{X}_{\mathbb{P}_i}(t)$ is weighted, and is denoted as follows:

$x_1^{(\mathbb{P}_i)}(t) = \mathcal{X}_{\mathbb{P}_i}(t) \times_2 w_2^{(\mathbb{P}_i)^*} \times_3 w_3^{(\mathbb{P}_i)^*} \in \mathbb{C}^{M_{\mathbb{P}_i}}$, $x_2^{(\mathbb{P}_i)}(t) = \mathcal{X}_{\mathbb{P}_i}(t) \times_1 w_1^{(\mathbb{P}_i)^*} \times_3 w_3^{(\mathbb{P}_i)^*} \in \mathbb{C}^{N_{\mathbb{P}_i}}$, $x_3^{(\mathbb{P}_i)}(t) = \mathcal{X}_{\mathbb{P}_i}(t) \times_1 w_1^{(\mathbb{P}_i)^*} \times_2 w_2^{(\mathbb{P}_i)^*} \in \mathbb{C}^6$, wherein $(•)^H$ denotes conjugation and transposition operations, and Lagrangian multiplier method is used to solve in order six sub-optimization problems corresponding to sparse uniform sub-planar arrays $\mathbb{P}_1$ and $\mathbb{P}_2$, and their respective three beamforming weight vectors $w_r^{(\mathbb{P}_1)}$ (r=1, 2, 3) and $w_r^{(\mathbb{P}_2)}$ (r=1, 2, 3), with closed-form solutions thereof as follows:

$$w_1^{(\mathbb{P}_1)} = \frac{R_1^{(\mathbb{P}_1)^{-1}} a_x^{(\mathbb{P}_1)}}{a_x^{(\mathbb{P}_1)^H} R_1^{(\mathbb{P}_1)^{-1}} a_x^{(\mathbb{P}_1)}}, w_1^{(\mathbb{P}_2)} = \frac{R_1^{(\mathbb{P}_2)^{-1}} a_x^{(\mathbb{P}_2)}}{a_x^{(\mathbb{P}_2)^H} R_1^{(\mathbb{P}_2)^{-1}} a_x^{(\mathbb{P}_2)}},$$

$$w_2^{(\mathbb{P}_1)} = \frac{R_2^{(\mathbb{P}_1)^{-1}} a_y^{(\mathbb{P}_1)}}{a_y^{(\mathbb{P}_1)^H} R_2^{(\mathbb{P}_1)^{-1}} a_y^{(\mathbb{P}_1)}}, w_2^{(\mathbb{P}_2)} = \frac{R_2^{(\mathbb{P}_2)^{-1}} a_y^{(\mathbb{P}_2)}}{a_y^{(\mathbb{P}_2)^H} R_2^{(\mathbb{P}_2)^{-1}} a_y^{(\mathbb{P}_2)}},$$

$$w_3^{(\mathbb{P}_1)} = \frac{R_3^{(\mathbb{P}_1)^{-1}} p}{p^H R_3^{(\mathbb{P}_1)^{-1}} p}, w_3^{(\mathbb{P}_2)} = \frac{R_3^{(\mathbb{P}_2)^{-1}} p}{p^H R_3^{(\mathbb{P}_2)^{-1}} p}.$$

Further, the step 4 specifically includes:

denoting the tensor beam power pattern $\mathcal{P}_{\mathbb{P}_i}(\acute{\theta}, \acute{\varphi})$ of the sparse uniform sub-planar array tensor beamformer $\mathcal{W}_{\mathbb{P}_i}$ equivalently as follows through a CANDECOMP/PARAFAC decomposition form substituted into $\mathcal{W}_{\mathbb{P}_i}$:

$$\mathcal{P}_{\mathbb{P}_i}(\acute{\theta}, \acute{\varphi}) = \left|<w_{\mathbb{P}_i}^*, c\mathcal{A}_{\mathbb{P}_i}(\acute{\theta}, \acute{\varphi}, \gamma, \eta)>\right|^2 =$$

$$\left|\left(a_x^{(\mathbb{P}_i)}(\acute{\theta}, \acute{\varphi}) w_1^{(\mathbb{P}_i)^H}\right)\left(a_y^{(\mathbb{P}_i)}(\acute{\theta}, \acute{\varphi}) w_2^{(\mathbb{P}_i)^H}\right)\left(p(\acute{\theta}, \acute{\varphi}, \gamma, \eta) w_3^{(\mathbb{P}_i)^H}\right)\right|^2,$$

wherein $\acute{\theta} \in [-\pi/2, \pi/2]$ and $\acute{\varphi} \in [-\pi/\pi]$; when DOA is in a direction of a desired signal, i.e. $\acute{\theta}=\theta$ and $\acute{\varphi}=\varphi$, a tensor beam power value of $\mathcal{P}_{\mathbb{P}_i}(\acute{\theta}, \acute{\varphi})$ reaches a maximum, which is regarded as a main lobe; at a two-dimensional DOA plane, virtual peaks exist in both tensor beam power patterns $\mathcal{P}_{\mathbb{P}_1}(\acute{\theta}, \acute{\varphi})$ and $\mathcal{P}_{\mathbb{P}_2}(\acute{\theta}, \acute{\varphi})$ of sparse uniform sub-planar arrays $\mathbb{P}_1$ and $\mathbb{P}_2$ and virtual peak positions ($\tilde{\theta}_a^{(\mathbb{P}_1)}, \tilde{\varphi}_a^{(\mathbb{P}_1)}$) and ($\tilde{\theta}_b^{(\mathbb{P}_2)}, \tilde{\varphi}_b^{(\mathbb{P}_2)}$) respectively corresponding thereto do not overlap each other, i.e. $\tilde{\theta}_a^{(\mathbb{P}_1)} \neq \tilde{\theta}_b^{(\mathbb{P}_2)}, \tilde{\varphi}_a^{(\mathbb{P}_1)} \neq \tilde{\varphi}_b^{(\mathbb{P}_2)}$.

Further, the step 5 specifically includes:

performing coprime composite processing on output signals of two sparse uniform sub-planar arrays, the virtual peak positions of which do not overlap each other, thereby realizing virtual-peak restrained electromagnetic vector coprime planar array tensor beamforming, wherein the coprime composite processing comprises coprime composite processing based on multiplicative rules and coprime composite processing based on power minimization rules.

Further, principles of the coprime composite processing based on multiplicative rules are as follows: when, in a two-dimensional DOA ($\tilde{\theta}_a^{(\mathbb{P}_1)}, \tilde{\varphi}_a^{(\mathbb{P}_1)}$), a tensor beam power pattern $\mathcal{P}_{\mathbb{P}_1}(\acute{\theta}, \acute{\varphi})$ of $\mathbb{P}_1$ corresponds to a virtual peak, and a tensor beam power pattern $\mathcal{P}_{\mathbb{P}_2}(\acute{\theta}, \acute{\varphi})$ of $\mathbb{P}_2$ does not correspond to a virtual peak, thus at a position of ($\tilde{\theta}_a^{(\mathbb{P}_1)}, \tilde{\varphi}_a^{(\mathbb{P}_1)}$), tensor beam power of $\mathcal{P}_{\mathbb{P}_1}(\acute{\theta}, \acute{\varphi})$ and $\mathcal{P}_{\mathbb{P}_2}(\acute{\theta}, \acute{\varphi})$ is multiplied and the virtual peak is retrained; similarly, when, in a two-dimensional DOA ($\tilde{\theta}_b^{(\mathbb{P}_2)}, \tilde{\varphi}_b^{(\mathbb{P}_2)}$), a tensor beam power pattern $\mathcal{P}_{\mathbb{P}_2}(\acute{\theta}, \acute{\varphi})$ of $\mathbb{P}_2$ corresponds to a virtual peak, and a tensor beam power pattern $\mathcal{P}_{\mathbb{P}_1}(\acute{\theta}, \acute{\varphi})$ of $\mathbb{P}_1$ does not correspond to a virtual peak, tensor beam power of $\mathcal{P}_{\mathbb{P}_1}(\acute{\theta}, \acute{\varphi})$ and $\mathcal{P}_{\mathbb{P}_2}(\acute{\theta}, \acute{\varphi})$ is multiplied and the virtual peak corresponding to the position can also be restrained; and an electromagnetic vector coprime planar array output signal $y_{mul}(t)$ based on multiplicative rules is obtained by multiplying output signals $y_{\mathbb{P}_1}(t)$ and $y_{\mathbb{P}_2}(t)$ of sparse uniform sub-planar arrays $\mathbb{P}_1$ and $\mathbb{P}_2$ at time t and is denoted as follows:

$$y_{mul}(t) = y_{\mathbb{P}_1(t)} * y_{\mathbb{P}_2(t)},$$

correspondingly, the tensor beam power pattern of the electromagnetic vector coprime planar array is an arithmetic square root of a product of tensor beam power patterns of two sparse uniform sub-planar arrays:

$$\mathcal{P}_{mul}(\acute{\theta}, \acute{\varphi}) = \sqrt{\mathcal{P}_{\mathbb{P}_1}(\acute{\theta}, \acute{\varphi}) * \mathcal{P}_{\mathbb{P}_2}(\acute{\theta}, \acute{\varphi})} = \left| <w_{\mathbb{P}_1}^*, \mathcal{A}_{\mathbb{P}_1}(\acute{\theta}, \acute{\varphi}, \gamma, \eta)> * <w_{\mathbb{P}_2}^*, \mathcal{A}_{\mathbb{P}_2}(\acute{\theta}, \acute{\varphi}, \gamma, \eta)> \right|.$$

Further, principles of the coprime composite processing based on power minimization rules are as follows: in a two-dimensional DOA ($\tilde{\theta}_a^{(\mathbb{P}_1)}, \tilde{\varphi}_a^{(\mathbb{P}_1)}$), a virtual peak response value $\mathcal{P}_{\mathbb{P}_1}(\tilde{\theta}_a^{(\mathbb{P}_1)}, \tilde{\theta}_a^{(\mathbb{P}_1)})$, of $\mathcal{P}_{\mathbb{P}_1}(\acute{\theta}, \acute{\varphi})$ is greater than a response value $\mathcal{P}_{\mathbb{P}_2}(\tilde{\theta}_a^{(\mathbb{P}_1)}, \tilde{\theta}_a^{(\mathbb{P}_1)})$, corresponding to a non-virtual peak position of $\mathcal{P}_{\mathbb{P}_2}(\acute{\theta}, \acute{\varphi})$ and the virtual peak is restrained by selecting a minimum value thereof; similarly, on ($\tilde{\theta}_b^{(\mathbb{P}_2)}, \tilde{\varphi}_b^{(\mathbb{P}_2)}$), a virtual peak response value $\mathcal{P}_{\mathbb{P}_1}(\tilde{\theta}_b^{(\mathbb{P}_2)}, \tilde{\theta}_b^{(\mathbb{P}_2)})$ of $\mathcal{P}_{\mathbb{P}_1}(\acute{\theta}, \acute{\varphi})$ is greater than a non-virtual peak position response value $\mathcal{P}_{\mathbb{P}_1}(\tilde{\theta}_b^{(\mathbb{P}_2)}, \tilde{\theta}_b^{(\mathbb{P}_2)})$ of $\mathcal{P}_{\mathbb{P}_1}(\acute{\theta}, \acute{\varphi})$ and the virtual peak is also restrained by selecting a minimum value thereof; and an output signal $y_{min}(t)$ of the electromagnetic vector coprime planar array based on power minimization rules is obtained by conducting minimization processing on power of output signals $y_{\mathbb{P}_1}(t)$ and $y_{\mathbb{P}_2}(t)$ of sparse uniform sub-planar arrays $\mathbb{P}_1$ and $\mathbb{P}_2$ at time t:

$$y_{min}(t) = \min(|y_{\mathbb{P}_1}(t)|^2, |y_{\mathbb{P}_2}(t)|^2),$$

wherein min (•) denotes a minimum value taking operation; and correspondingly, the tensor beam power pattern of the electromagnetic vector coprime planar array is constituted by selecting a minimum value through comparison of tensor beam power of two sparse uniform sub-planar arrays in each two-dimensional DOA:

$$\mathcal{P}_{min}(\acute{\theta},\acute{\varphi}) = \min(|<w_{\mathbb{P}_i}^*, \mathcal{A}_{\mathbb{P}_i}(\acute{\theta},\acute{\varphi},\gamma,\eta)>|^2).$$

The present invention has the following advantages as compared with the prior art:

(1) The present invention matches a multi-dimensional receiving signal structure of an electromagnetic vector coprime planar array. While constructing a tensor signal to reserve its original structural information, principles of spatial filtering for a coprime sparse uniform sub-planar array receiving signal tensor is formed, thereby laying a foundation to electromagnetic vector coprime planar array tensor beamforming having a capability of restraining a virtual peak;

(2) The present invention matches coprime arrangement features of two sparse uniform sub-planar arrays to obtain a feature that virtual peaks of the two sparse uniform sub-planar arrays do not overlap each other, based on which a coprime composite processing's technical framework based on the sparse uniform sub-planar arrays is constructed; and two coprime composite processing measures proposed under the framework both restrain the virtual peaks effectively;

(3) By fully combining the multi-dimensional receiving signal structure of the electromagnetic vector coprime planar array with the sparse arrangement feature of the array, the present invention creates a correlation between the multi-dimensional receiving signal structure of the electromagnetic vector coprime planar array and principles of tensor spatial filtering and a correlation between the coprime arrangement feature of the sparse uniform sub-planar arrays and distribution of the virtual peaks, thereby forming a roadmap for electromagnetic vector coprime planar array tensor beamforming technique based on coprime composite processing of the sparse uniform sub-planar arrays.

DESCRIPTION OF THE EMBODIMENTS

To make the objectives, technical solutions, and technical effects of the present invention more comprehensible, the following describes the present invention in details with reference to accompanying drawings and embodiments.

Figure 1:
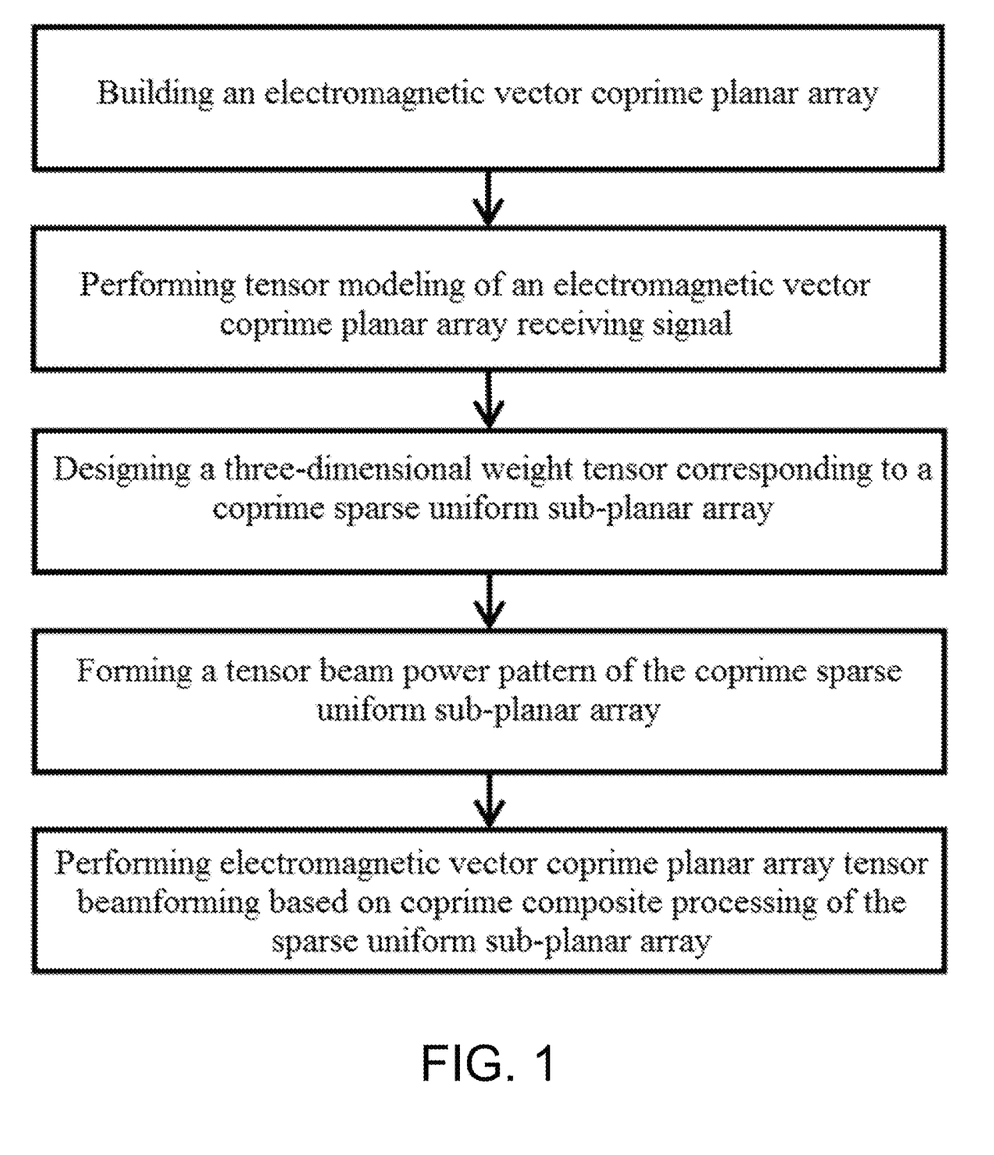
FIG. 1 is a block diagram for a total flow of the present invention.
Figure 2:
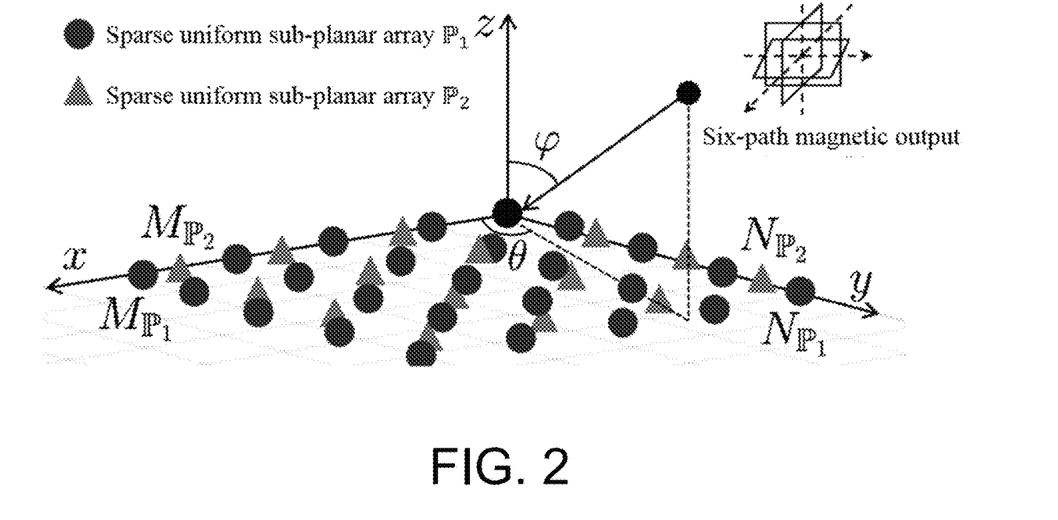
FIG. 2 is a structural diagram of an electromagnetic vector coprime planar array in the present invention.

As shown in FIG. 1, the present invention realizes electromagnetic vector coprime planar array tensor beamforming having capability of restraining a virtual peak and output performance improvement by spatial filtering of a coprime sparse uniform sub-planar array receiving signal tensor and matching coprime composite processing on a sub-planar array output signal of a feature that virtual peaks corresponding to coprime sparse uniform sub-planar arrays do not overlap each other, with specific realization steps comprising:

step 1: building an electromagnetic vector coprime planar array;

using $M_{\mathbb{P}_1}N_{\mathbb{P}_1} + M_{\mathbb{P}_2}N_{\mathbb{P}_2} - 1$ electromagnetic vector antenna elements by a receiving end to construct an electromagnetic vector coprime planar array, wherein each of the antenna elements uses three mutually orthogonal electric doublets and three mutually orthogonal magnetic dipoles to realize sensing of electromagnetic field, thereby possessing a six-path output;

As shown in FIG. 2, a pair of sparse uniform sub-planar arrays $\mathbb{P}_1$ and $\mathbb{P}_2$ are structured on a plane coordinate system xoy, $\mathbb{P}_1$ and $\mathbb{P}_2$ respectively comprising $M_{\mathbb{P}_1} \times N_{\mathbb{P}_1}$ and $M_{\mathbb{P}_2} \times N_{\mathbb{P}_2}$ antenna elements, wherein $M_{\mathbb{P}_1}, M_{\mathbb{P}_2}$ and $N_{\mathbb{P}_1}, N_{\mathbb{P}_2}$ are respectively a pair of coprime integers; intervals of antenna elements of the sparse uniform sub-planar array $\mathbb{P}_1$ in x axis and y axis directions are respectively $M_{\mathbb{P}_2}d$ and $N_{\mathbb{P}_2}d$, wherein a unit interval is $d=\lambda/2$, and $\lambda$ denotes a signal wavelength; similarly, intervals of the antenna elements of the sparse uniform sub-planar array $\mathbb{P}_2$ in x axis and y axis directions are respectively $M_{\mathbb{P}_1}d$ and $N_{\mathbb{P}_1}d$, wherein in $\mathbb{P}_1$, positions of the $(m_{\mathbb{P}_1}, n_{\mathbb{P}_1})^{th}$ antenna element in x axis and y axis directions are respectively $$x_{\mathbb{P}_1}^{(m_{\mathbb{P}_1})} = (m_{\mathbb{P}_1} - 1)M_{\mathbb{P}_2}d$$

and $$y_{\mathbb{P}_1}^{(n_{\mathbb{P}_1})} = (n_{\mathbb{P}_1} - 1)N_{\mathbb{P}_2}d,$$

wherein $m_{\mathbb{P}_1}=1, 2, \ldots, M_{\mathbb{P}_1}$, $n_{\mathbb{P}_1}=1, 2, \ldots, N_{\mathbb{P}_1}$; in $\mathbb{P}_2$, positions of the $(m_{\mathbb{P}_2}, n_{\mathbb{P}_2})^{th}$ antenna element in x axis and y axis directions are respectively $$x_{\mathbb{P}_2}^{(m_{\mathbb{P}_2})} = (m_{\mathbb{P}_2} - 1)M_{\mathbb{P}_1}d$$

and $$y_{\mathbb{P}_2}^{(n_{\mathbb{P}_2})} = (n_{\mathbb{P}_2} - 1)N_{\mathbb{P}_1}d,$$

wherein $m_{\mathbb{P}_2}=1, 2, \ldots, M_{\mathbb{P}_2}$, $n_{\mathbb{P}_2}=1, 2, \ldots, N_{\mathbb{P}_2}$; and sub-arrays are combined in a manner of superimposing) elements ($x_{\mathbb{P}_1}^{(1)} = x_{\mathbb{P}_2}^{(1)} = y_{\mathbb{P}_1}^{(1)} = y_{\mathbb{P}_2}^{(1)} = 0$) at a position of an origin point of the coordinate system for $\mathbb{P}_1$ and $\mathbb{P}_2$, thereby obtaining an electromagnetic vector coprime planar array actually comprising $M_{\mathbb{P}_1}N_{\mathbb{P}_1} + M_{\mathbb{P}_2}N_{\mathbb{P}_2} - 1$ antenna elements;

step 2: performing tensor modeling of an electromagnetic vector coprime planar array receiving signal;

setting a far-field narrow-band desired signal that is incident to the electromagnetic vector coprime planar array from a $(\theta, \varphi)$ direction, wherein $\theta$ and $\varphi$ respectively denote an azimuth angle and a pitch angle of the desired signal and $\theta \in [-\pi/2, \pi/2]$, $\varphi \in [-\pi, \pi]$; the six-path output of each of the elements in the electromagnetic vector coprime planar array simultaneously comprises Direction of Arrival (DOA) information $U(\theta, \varphi) \in \mathbb{C}^{6 \times 2}$ and polarized state information $g(\gamma, \eta) \in \mathbb{C}^2$, wherein $\gamma \in [0, 2\pi]$ and $\eta \in [-\pi, \pi]$ respectively denote a polarized auxiliary angle and a polarized phase difference, and a DOA matrix $U(\theta, \varphi)$ and a polarized state vector $g(\gamma, \eta)$ are specifically defined as:

$$U(\theta, \varphi) = \begin{bmatrix} -\sin\theta & \cos\varphi\cos\theta \\ \cos\theta & \cos\varphi\sin\theta \\ 0 & -\sin\varphi \\ \cos\varphi\cos\theta & \sin\theta \\ \cos\varphi\sin\theta & -\cos\theta \\ -\sin\varphi & 0 \end{bmatrix},$$

$$g(\gamma, \eta) = \begin{bmatrix} \cos\gamma \\ \sin\gamma\, e^{j\eta} \end{bmatrix},$$

wherein $j=\sqrt{-1}$, and correspondingly, output of each of the elements in the electromagnetic vector coprime planar array is denoted with a spatial electromagnetic response vector $p \in \mathbb{C}^6$ as follows:

$$p = U(\theta, \varphi)g(\gamma, \eta).$$

when G non-relevant interfering signals exist simultaneously in a space, the DOA matrix, the polarized state vector and the spatial electromagnetic response vector thereof are respectively denoted by $\overline{U}(\overline{\theta}_g, \overline{\varphi}_g)$, $\overline{g}(\overline{\gamma}_g, \overline{\eta}_g)$ and $\overline{p}_g = \overline{U}(\overline{\theta}_g, \overline{\varphi}_g)\overline{g}(\overline{\gamma}_g, \overline{\eta}_g)$, wherein $g=1, 2, \ldots, G$;

reserving three-dimensional spatial information of a receiving signal of the sparse uniform sub-planar array $\mathbb{P}_i$ (i=1, 2) at time t, i.e. DOA information and spatial electromagnetic response information in x axis direction and y axis direction, which are denoted with one three-dimensional tensor, and superimposing a three-dimensional signal tensor snapped by the collected T sampling blocks on a time dimension as a fourth dimension, thereby constituting a receiving signal tensor $$\mathcal{X}_{\mathbb{P}_i} \in \mathbb{C}^{M_{\mathbb{P}_i} \times N_{\mathbb{P}_i} \times 6 \times T}$$

corresponding to the sparse uniform sub-planar array $\mathbb{P}_i$, the receiving signal tensor $$\mathcal{X}_{\mathbb{P}_i} \in \mathbb{C}^{M_{\mathbb{P}_i} \times N_{\mathbb{P}_i} \times 6 \times T}$$

being denoted as follows:

$$\mathcal{X}_{\mathbb{P}_i} = a_x^{(\mathbb{P}_i)} \circ a_y^{(\mathbb{P}_i)} \circ p \circ s + \sum_{g=1}^{G} \overline{a}_{xg}^{(\mathbb{P}_i)} \circ \overline{a}_{yg}^{(\mathbb{P}_i)} \circ \overline{p}_g \circ \overline{s}_g + \mathcal{N}_{\mathbb{P}_i}$$

wherein $$a_x^{(\mathbb{P}_i)} = \left[1, e^{-j\frac{2\pi}{\lambda}x_{\mathbb{P}_i}^{(2)}\mu}, \ldots, e^{-j\frac{2\pi}{\lambda}x_{\mathbb{P}_i}^{(M_{\mathbb{P}_i})}\mu}\right]^T \in \mathbb{C}^{M_{\mathbb{P}_i}}$$

and $$a_y^{(\mathbb{P}_i)} = \left[1, e^{-j\frac{2\pi}{\lambda}y_{\mathbb{P}_i}^{(2)}\nu}, \ldots, e^{-j\frac{2\pi}{\lambda}y_{\mathbb{P}_i}^{(N_{\mathbb{P}_i})}\nu}\right]^T \in \mathbb{C}^{N_{\mathbb{P}_i}}$$

respectively denote a desired signal guiding vector of the electromagnetic vector coprime planar array in x axis and y axis directions, and $\mu = \sin\varphi\cos\theta$ and $\nu = \sin\varphi\sin\theta$, $s=[s(1), s(2), \ldots, s(T)]^T \in \mathbb{C}^T$ is a signal waveform of the desired signal, $\circ$ denotes an outer product of vectors, $(\cdot)^T$ denotes an transposition operation, and $$\mathcal{N}_{\mathbb{P}_i} \in \mathbb{C}^{M_{\mathbb{P}_i} \times N_{\mathbb{P}_i} \times 6 \times T}$$

is an independent co-distributed additive white Gaussian noise tensor; and then $$\overline{a}_{xg}^{(\mathbb{P}_i)} \in \mathbb{C}^{M_{\mathbb{P}_i}}$$

and $$\overline{a}_{yg}^{(\mathbb{P}_i)} \in \mathbb{C}^{N_{\mathbb{P}_i}}$$

respectively denote guiding vectors of the electromagnetic vector coprime planar array in x axis and y axis directions, corresponding to the $g^{th}$ interfering signal, and $\bar{s}_g \in \mathbb{C}^T$ denotes a signal waveform of the $g^{th}$ interfering signal.

step 3: designing a three-dimensional weight tensor corresponding to a coprime sparse uniform sub-planar array;

for a receiving signal tensor $$\mathcal{X}_{\mathbb{P}_i}(t) \in \mathbb{C}^{M_{\mathbb{P}_i} \times N_{\mathbb{P}_i} \times 6}$$

of two sparse uniform sub-planar arrays that compose the electromagnetic vector coprime planar array at time t, setting a three-dimensional weight tensor $$\mathcal{W}_{\mathbb{P}_i} \in \mathbb{C}^{M_{\mathbb{P}_i} \times N_{\mathbb{P}_i} \times 6}$$

matching multi-dimensional structure information thereof, performing spatial filtering on $\mathcal{X}_{\mathbb{P}_i}(t)$ through $\mathcal{W}_{\mathbb{P}_i}$, and forming a beam directivity in the DOA corresponding to the desired signal, thereby obtaining an output signal $y_{\mathbb{P}_i}(t)$, which is denoted as follows:

$$y_{\mathbb{P}_i}(t) = \langle \mathcal{X}_{\mathbb{P}_i}(t), \mathcal{W}_{\mathbb{P}_i}^* \rangle, t=1, 2, \ldots, T,$$

wherein $\langle \cdot \rangle$ denotes an inner product of tensors, $(\cdot)^*$ denotes a conjugation operation; then in order to obtain a tensor beamformer $\mathcal{W}_{\mathbb{P}_i}$ corresponding to two sparse uniform sub-planar arrays, minimizing an average output power of a tensor beamformer and performing optimization processing to ensure that the DOA of the desired signal and a response corresponding to a polarized state thereof should not be distorted, with an expression being as follows:

$$\min_{\mathcal{W}_{\mathbb{P}_i}} E[|y_{\mathbb{P}_i}(t)|^2]$$

s.t. $\langle \mathcal{W}_{\mathbb{P}_i}^*, \mathcal{A}_{\mathbb{P}_i}(\theta, \varphi, \gamma, \eta) \rangle = 1,$ wherein $$\mathcal{A}_{\mathbb{P}_i}(\theta, \varphi, \gamma, \eta) = a_x^{(\mathbb{P}_i)} \circ a_y^{(\mathbb{P}_i)} \circ p \in \mathbb{C}^{M_{\mathbb{P}_i} \times N_{\mathbb{P}_i} \times 6}$$

denotes a three-dimensional space manifold tensor of the sparse uniform sub-planar array $\mathbb{P}_i$ corresponding to a DOA $(\theta, \varphi)$ and a polarized state $(\gamma, \eta)$ of a desired signal, $|\cdot|$ denotes a modulo operation of complex number, and $E[\cdot]$ denotes an expectation-taking operation; through solving, three-dimensional weight tensors $\mathcal{W}_{\mathbb{P}_1}$ and $\mathcal{W}_{\mathbb{P}_2}$ respectively corresponding to sparse uniform sub-planar arrays $\mathbb{P}_1$ and $\mathbb{P}_2$ are obtained and output signals $y_{\mathbb{P}_1}(t)$ and $y_{\mathbb{P}_2}(t)$ are generated;

wherein each space dimension information of the three-dimensional weight tensors $\mathcal{W}_{\mathbb{P}_i}$ and $\mathcal{X}_{\mathbb{P}_i}(t)$ corresponds to each other, $\mathcal{W}_i$ decomposed in a manner of CANDECOMP/PARAFAC is denoted as an outer product of a beamforming weight vector corresponding to DOA information in $$w_1^{(\mathbb{P}_i)} \in \mathbb{C}^{M_{\mathbb{P}_i}}$$

in x axis, DOA information $$w_2^{(\mathbb{P}_i)} \in \mathbb{C}^{M_{\mathbb{P}_i}}$$

in y axis and spatial electromagnetic response information $w_3^{(\mathbb{P}_i)} \in \mathbb{C}^6$:

$$\mathcal{W}_{\mathbb{P}_i} = w_1^{(\mathbb{P}_i)} \circ w_2^{(\mathbb{P}_i)} \circ w_3^{(\mathbb{P}_i)}.$$

then, an output signal $y_{\mathbb{P}_i}(t)$ of the sparse uniform sub-planar array $\mathbb{P}_i$ at time t can be denoted as follows:

$$y_{\mathbb{P}_i}(t) = \mathcal{X}_{\mathbb{P}_i}(t) \times_1 w_1^{(\mathbb{P}_i)^*} \times_2 w_2^{(\mathbb{P}_i)^*} \times_3 w_3^{(\mathbb{P}_i)^*},$$

wherein $\times_r$ denotes an inner product of a tensor and a matrix along the $r^{th}$ dimension; thus, a weight tensor $\mathcal{W}_{\mathbb{P}_i}$ corresponding to a receiving signal tensor $\mathcal{X}_{\mathbb{P}_i}(t)$ is weighted to be equivalently denoted as multi-dimensional weight of the above three beamforming weight vector $w_r^{(\mathbb{P}_i)}$, r=1, 2, 3, for $\mathcal{X}_{\mathbb{P}_i}(t)$, and a corresponding optimization problem can be denoted as follows:

$$\min_{w_r^{(\mathbb{P}_i)}(r=1,2,3)} w_r^{(\mathbb{P}_i)^H} R_r^{(\mathbb{P}_i)} w_r^{(\mathbb{P}_i)}$$

s.t. $w_1^{(\mathbb{P}_i)^H} a_x^{(\mathbb{P}_i)} = 1,$ $w_2^{(\mathbb{P}_i)^H} a_y^{(\mathbb{P}_i)} = 1,$ $w_3^{(\mathbb{P}_i)^H} p = 1,$ wherein $$R_r^{(\mathbb{P}_i)} = E[x_r^{(\mathbb{P}_i)}(t)(x_r^{(\mathbb{P}_i)}(t))^H], x_r^{(\mathbb{P}_i)}$$

denotes an output signal of the sparse uniform sub-planar array $\mathbb{P}_i$ at the $r^{th}$ dimension, and a beamforming weight vector of remaining two dimensions other than the $r^{th}$ dimension is obtained after $\mathcal{X}_{\mathbb{P}_i}(t)$ is weighted, and is denoted as follows:

$$x_1^{(\mathbb{P}_i)}(t) = \mathcal{X}_{\mathbb{P}_i}(t) \times_2 w_2^{(\mathbb{P}_i)^*} \times_3 w_3^{(\mathbb{P}_i)^*} \in \mathbb{C}^{M_{\mathbb{P}_i}},$$

$$x_2^{(\mathbb{P}_i)}(t) = \mathcal{X}_{\mathbb{P}_i}(t) \times_1 w_1^{(\mathbb{P}_i)^*} \times_3 w_3^{(\mathbb{P}_i)^*} \in \mathbb{C}^{N_{\mathbb{P}_i}},$$

$$x_3^{(\mathbb{P}_i)}(t) = \mathcal{X}_{\mathbb{P}_i}(t) \times_1 w_1^{(\mathbb{P}_i)^*} \times_2 w_2^{(\mathbb{P}_i)^*} \in \mathbb{C}^6,$$

wherein $(\cdot)^H$ denotes conjugation and transposition operations, and Lagrangian multiplier method is used to solve in order six sub-optimization problems corresponding to sparse uniform sub-planar arrays $\mathbb{P}_1$ and $\mathbb{P}_2$, and their respective three beamforming weight vectors $w_r^{(\mathbb{P}_1)}$ (r=1, 2, 3) and $w_r^{(\mathbb{P}_2)}$ (r=1, 2, 3), with closed-form solutions thereof as follows:

$$w_1^{(\mathbb{P}_1)} = \frac{R_1^{(\mathbb{P}_1)^{-1}} a_x^{(\mathbb{P}_1)}}{a_x^{(\mathbb{P}_1)^H} R_1^{(\mathbb{P}_1)^{-1}} a_x^{(\mathbb{P}_1)}}, \quad w_1^{(\mathbb{P}_2)} = \frac{R_1^{(\mathbb{P}_2)^{-1}} a_x^{(\mathbb{P}_2)}}{a_x^{(\mathbb{P}_2)^H} R_1^{(\mathbb{P}_2)^{-1}} a_x^{(\mathbb{P}_2)}},$$

$$w_2^{(\mathbb{P}_1)} = \frac{R_2^{(\mathbb{P}_1)^{-1}} a_y^{(\mathbb{P}_1)}}{a_y^{(\mathbb{P}_1)^H} R_2^{(\mathbb{P}_1)^{-1}} a_y^{(\mathbb{P}_1)}}, \quad w_2^{(\mathbb{P}_2)} = \frac{R_2^{(\mathbb{P}_2)^{-1}} a_y^{(\mathbb{P}_2)}}{a_y^{(\mathbb{P}_2)^H} R_2^{(\mathbb{P}_2)^{-1}} a_y^{(\mathbb{P}_2)}},$$

-continued $$w_3^{(\mathbb{P}_1)} = \frac{R_3^{(\mathbb{P}_1)^{-1}} p}{p^H R_3^{(\mathbb{P}_1)^{-1}} p}, \quad w_3^{(\mathbb{P}_2)} = \frac{R_3^{(\mathbb{P}_2)^{-1}} p}{p^H R_3^{(\mathbb{P}_2)^{-1}} p}$$

step 4: forming a tensor beam power pattern of the coprime sparse uniform sub-planar array;

denoting the tensor beam power pattern $\mathcal{P}_{\mathbb{P}_i}(\theta, \varphi)$ of the sparse uniform sub-planar array tensor beamformer $\mathcal{W}_{\mathbb{P}_i}$ equivalently as follows through a CANDECOMP/PARAFAC decomposition form substituted into $\mathcal{W}_{\mathbb{P}_i}$:

$$\mathcal{P}_{\mathbb{P}_i}(\theta', \varphi') = \left| < w_{\mathbb{P}_i}^*, \mathcal{A}_{\mathbb{P}_i}(\theta', \varphi', \gamma, \eta) > \right|^2 =$$
$$\left| (a_x^{(\mathbb{P}_i)}(\theta', \varphi') w_1^{(\mathbb{P}_i)H})(a_y^{(\mathbb{P}_i)}(\theta', \varphi') w_2^{(\mathbb{P}_i)H})(p(\theta', \varphi', \gamma, \eta) w_3^{(\mathbb{P}_i)H}) \right|^2,$$

wherein $\theta \in [-\pi/2, \pi/2]$ and $\varphi \in [-\pi, \pi]$; when DOA is in a direction of a desired signal, i.e. $\theta' = \theta$ and $\varphi' = \varphi$, a tensor beam power value of $\mathcal{P}_{\mathbb{P}_i}(\theta', \varphi')$ reaches a maximum, which is regarded as a main lobe. However, an interval of elements in the sparse uniform sub-planar array is greater than a half wavelength, thereby failing to satisfy a Nyquist sampling rate, resulting in that when $(\theta', \varphi') = (\tilde{\theta}_a^{(\mathbb{P}_1)}, \tilde{\varphi}_a^{(\mathbb{P}_1)})$, $\alpha = 1, 2, \ldots, A$, a virtual peak exists in $\mathcal{P}_{\mathbb{P}_1}(\theta', \varphi')$; and when $(\theta', \varphi') = (\tilde{\theta}_b^{(\mathbb{P}_2)}, \tilde{\varphi}_b^{(\mathbb{P}_2)})$, $b = 1, 2, \ldots, B$, a virtual peak exists in $\mathcal{P}_{\mathbb{P}_2}(\theta', \varphi')$. Since the arrangement of the elements of the sparse uniform sub-planar arrays $\mathbb{P}_1$ and $\mathbb{P}_2$ along x axis direction and y axis direction satisfies a coprime feature, thus in a two-dimensional DOA plane, the virtual peak positions $(\tilde{\theta}_a^{(\mathbb{P}_1)}, \tilde{\varphi}_a^{(\mathbb{P}_1)})$ and $(\tilde{\theta}_b^{(\mathbb{P}_2)}, \tilde{\varphi}_b^{(\mathbb{P}_2)})$ respectively corresponding to the sparse uniform sub-planar arrays $\mathbb{P}_1$ and $\mathbb{P}_2$ do not overlap each other, i.e. $\tilde{\theta}_a^{(\mathbb{P}_1)} \neq \tilde{\theta}_b^{(\mathbb{P}_2)}, \tilde{\varphi}_a^{(\mathbb{P}_1)} \neq \tilde{\varphi}_b^{(\mathbb{P}_2)}$.

step 5: performing electromagnetic vector coprime planar array tensor beamforming based on coprime composite processing of the sparse uniform sub-planar array.

performing composite processing on output signals of coprime sparse uniform sub-planar arrays by using a feature that virtual peak positions of the two sparse uniform sub-planar arrays do not overlap each other, thereby realizing virtual-peak restrained electromagnetic vector coprime planar array tensor beamforming, wherein the coprime composite processing of the sparse uniform sub-planar array output signal comprises coprime composite processing based on multiplicative rules and coprime composite processing based on power minimization rules.

Figure 3:
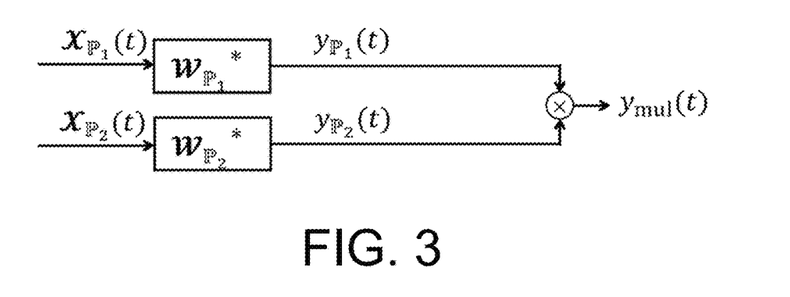
FIG. 3 is a block diagram of coprime composite processing flow based on multiplicative rules in the present invention.

Principles of the coprime composite processing based on multiplicative rules are as follows: when, in a two-dimensional DOA $(\tilde{\theta}_a^{(\mathbb{P}_1)}, \tilde{\varphi}_a^{(\mathbb{P}_1)})$, a tensor beam power pattern $\mathcal{P}_{\mathbb{P}_1}(\theta, \varphi)$ of $\mathbb{P}_1$ corresponds to a virtual peak, and a tensor beam power pattern $\mathcal{P}_{\mathbb{P}_2}(\theta, \varphi)$ of $\mathbb{P}_2$ does not correspond to a virtual peak, thus at a position of $(\tilde{\theta}_a^{(\mathbb{P}_1)}, \tilde{\varphi}_a^{(\mathbb{P}_1)})$, tensor beam power of $\mathcal{P}_{\mathbb{P}_1}(\theta, \varphi)$ and $\mathcal{P}_{\mathbb{P}_2}(\theta, \varphi)$ is multiplied and the virtual peak is retrained; similarly, when, in a two-dimensional DOA $(\tilde{\theta}_b^{(\mathbb{P}_2)}, \tilde{\varphi}_b^{(\mathbb{P}_2)})$, a tensor beam power pattern $\mathcal{P}_{\mathbb{P}_2}(\theta, \varphi)$ of $\mathbb{P}_2$ corresponds to a virtual peak, and a tensor beam power pattern $\mathcal{P}_{\mathbb{P}_1}(\theta, \varphi)$ of $\mathbb{P}_1$ does not correspond to a virtual peak, tensor beam power of $\mathcal{P}_{\mathbb{P}_1}(\theta, \varphi)$ and $\mathcal{P}_{\mathbb{P}_2}(\theta, \varphi)$ is multiplied and the virtual peak corresponding to the position can also be restrained. As shown in FIG. 3, an electromagnetic vector coprime planar array output signal based on multiplicative rules is obtained by multiplying output signals of sparse uniform sub-planar arrays and at time and is denoted as follows: As shown in FIG. 3, an electromagnetic vector coprime planar array output signal $y_{mul}(t)$ based on multiplicative rules is obtained by multiplying output signals $y_{\mathbb{P}_1}(t)$ and $y_{\mathbb{P}_2}(t)$ of sparse uniform sub-planar array $\mathbb{P}_1$ and $\mathbb{P}_2$ at time t and is denoted as follows:

$$y_{mul}(t) = y_{\mathbb{P}_1}(t) * y_{\mathbb{P}_2}(t).$$

correspondingly, the tensor beam power pattern thereof is an arithmetic square root of a product of tensor beam power patterns of two sparse uniform sub-planar arrays:

$$\mathcal{P}_{mul}(\theta', \varphi') = \sqrt{\mathcal{P}_{\mathbb{P}_1}(\theta', \varphi') * \mathcal{P}_{\mathbb{P}_2}(\theta', \varphi')} =$$
$$\left| < \mathcal{W}_{\mathbb{P}_1}^*, \mathcal{A}_{\mathbb{P}_1}(\theta', \varphi', \gamma, \eta) > * < \mathcal{W}_{\mathbb{P}_2}^*, \mathcal{A}_{\mathbb{P}_2}(\theta', \varphi', \gamma, \eta) > \right|.$$

Figure 4:
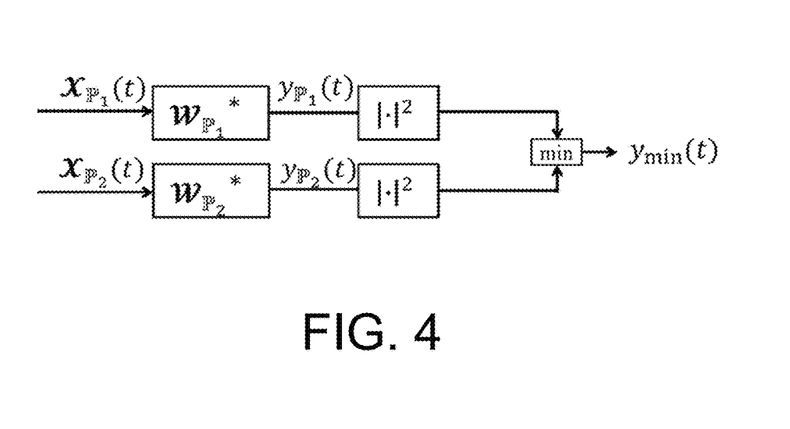
FIG. 4 is a block diagram of coprime composite processing flow based on power minimization rules in the present invention.

Principles of the coprime composite processing based on power minimization rules are as follows: in a two-dimensional DOA $(\tilde{\theta}_a^{(\mathbb{P}_1)}, \tilde{\varphi}_a^{(\mathbb{P}_1)})$, a virtual peak response value $\mathcal{P}_{\mathbb{P}_1}(\tilde{\theta}_a^{(\mathbb{P}_1)}, \tilde{\varphi}_a^{(\mathbb{P}_1)})$ of $\mathcal{P}_{\mathbb{P}_1}(\theta, \varphi)$ is greater than a response value $\mathcal{P}_{\mathbb{P}_2}(\tilde{\theta}_a^{(\mathbb{P}_1)}, \tilde{\varphi}_a^{(\mathbb{P}_1)})$ corresponding to a non-virtual peak position of $\mathcal{P}_{\mathbb{P}_2}(\theta, \varphi)$ and the virtual peak is restrained by selecting a minimum value thereof; similarly, on $(\tilde{\theta}_b^{(\mathbb{P}_2)}, \tilde{\varphi}_b^{(\mathbb{P}_2)})$, a virtual peak response value $\mathcal{P}_{\mathbb{P}_2}(\tilde{\theta}_b^{(\mathbb{P}_2)}, \tilde{\theta}_b^{(\mathbb{P}_2)})$ of $\mathcal{P}_{\mathbb{P}_2}(\theta, \varphi)$ is greater than a non-virtual peak position response value $\mathcal{P}_{\mathbb{P}_1}(\tilde{\theta}_b^{(\mathbb{P}_2)}, \tilde{\theta}_b^{(\mathbb{P}_2)})$ of $\mathcal{P}_{\mathbb{P}_1}(\theta, \varphi)$ and the virtual peak is also restrained by selecting a minimum value thereof. As shown in FIG. 4, an output signal under the rules is obtained by conducting minimization processing on power of output signals $y_{\mathbb{P}_1}(t)$ and $y_{\mathbb{P}_2}(t)$ of sparse uniform sub-planar arrays $\mathbb{P}_1$ and $\mathbb{P}_2$ at time t.

$$y_{min}(t) = \min(|y_{\mathbb{P}_1}(t)|^2, |y_{\mathbb{P}_2}(t)|^2),$$

wherein min (•) denotes a minimum value taking operation; and correspondingly, the tensor beam power pattern thereof is constituted by selecting a minimum value through comparison of tensor beam power of two sparse uniform sub-planar arrays in each two-dimensional DOA:

$$\mathcal{P}_{min}(\theta, \varphi) = \min(|< \mathcal{W}_{\mathbb{P}_i}^*, \mathcal{A}_{\mathbb{P}_i}(\theta, \varphi, \gamma, \eta) >|^2).$$

The effects of the present invention are further described below in combination with embodiments:

Embodiment 1: an electromagnetic vector coprime planar array is used to receive an incident signal and parameters thereof are selected as $M_{\mathbb{P}_1} = N_{\mathbb{P}_1} = 5$ and $M_{\mathbb{P}_2} = N_{\mathbb{P}_2} = 4$, that is, the electromagnetic vector coprime planar array of the architecture comprises $M_{\mathbb{P}_1} N_{\mathbb{P}_1} + M_{\mathbb{P}_2} N_{\mathbb{P}_2} - 1 = 40$ antenna elements in total. It is assumed that a desired signal is located at (θ, φ)=(30°, 45°) and carries a polarized auxiliary angle γ=15° and a phase difference subangle η=−20°; an interfering signal is located at $(\bar{\theta}_1, \bar{\varphi}_1)$=(10°, 15°); and $\bar{\gamma}_1$=−25°, $\bar{\eta}_1$=−35°.

Figure 5A:
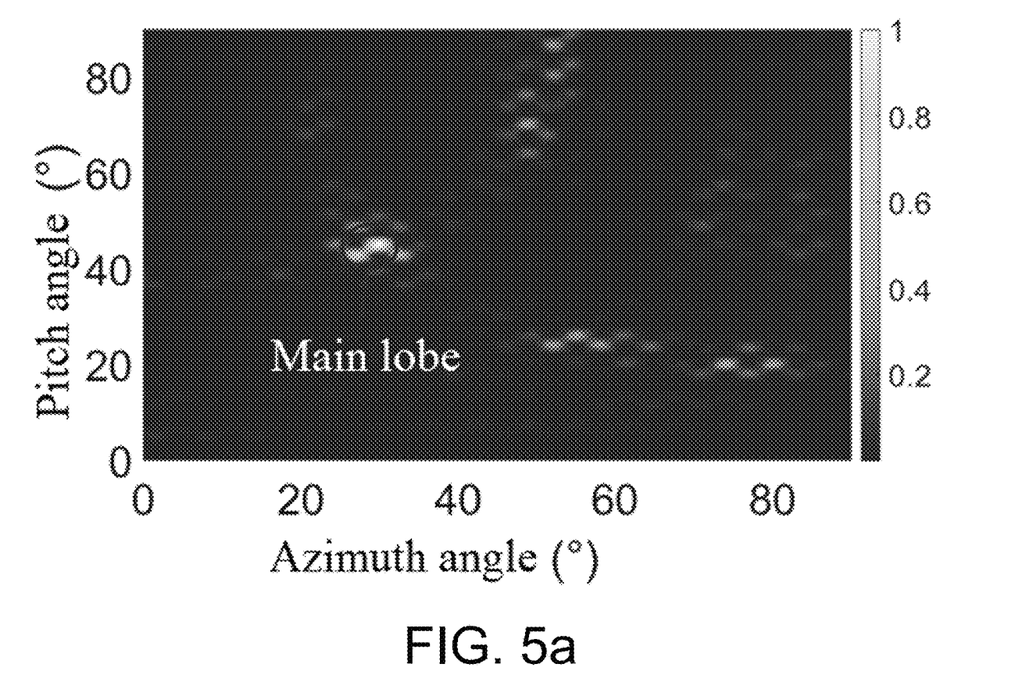
FIG. 5a is a schematic diagram of a tensor beam power pattern effect based on multiplicative rules in the present invention.
Figure 5B:
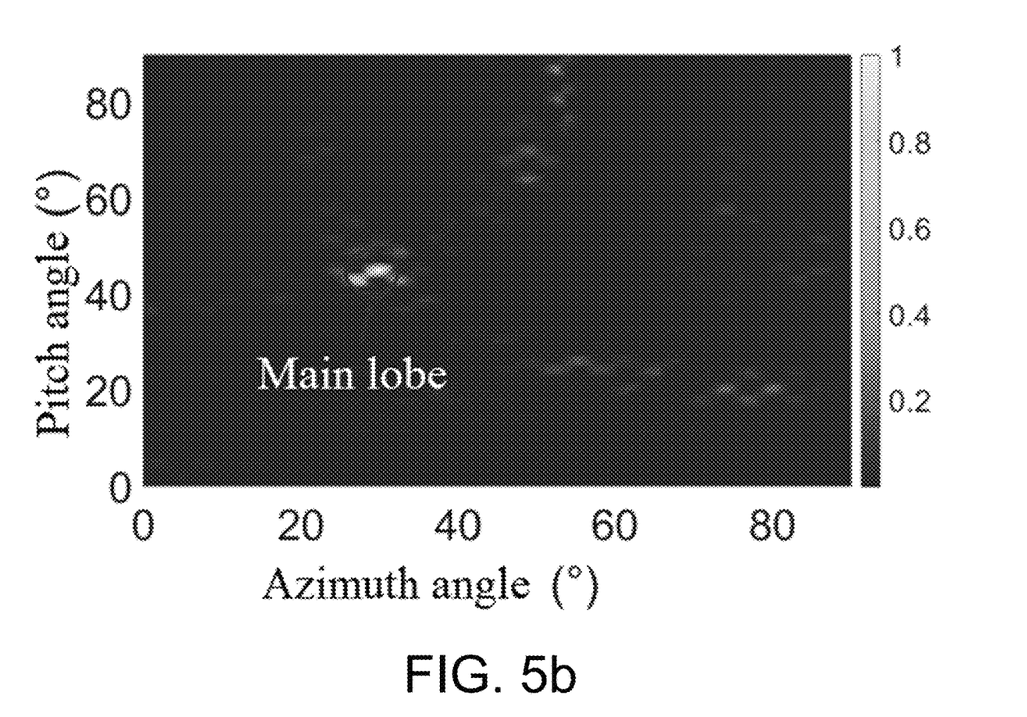
FIG. 5b is a schematic diagram of a tensor beam power pattern effect based on power minimization rules in the present invention.

When a signal-to-noise ratio (SNR) of a desired signal is 0 dB and the number of snapshots of the samples is T=300, the tensor beam power patterns $\mathcal{P}_{mul}(\theta, \varphi)$ and $\mathcal{P}_{min}(\theta, \varphi)$ of the electromagnetic vector coprime planar array based on multiplicative rules and power minimization rules are drawn as shown in FIG. 5a and FIG. 5b. The tensor beam power pattern of the electromagnetic vector coprime planar array corresponds to one main lobe at a DOA position of a desired signal and a virtual peak does not exist at other positions. Thus, it can be seen that the composite tensor beamforming method of the electromagnetic vector coprime planar array as proposed restrains the virtual peak effectively.

Figure 6A:
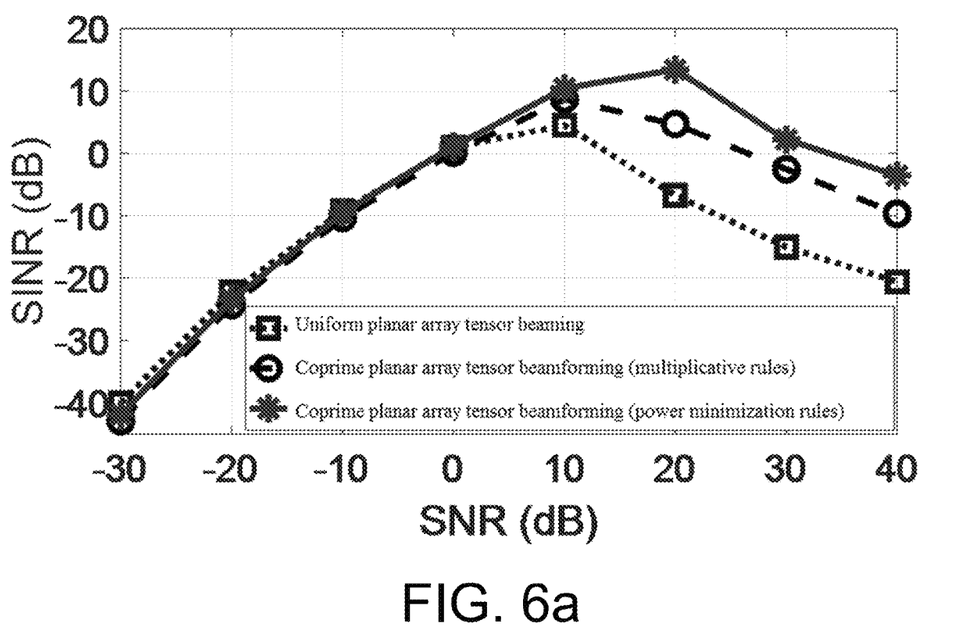
FIG. 6a is a performance comparison diagram of an output signal to noise ratio (SINR) varying with SNR in the present invention.
Figure 6B:
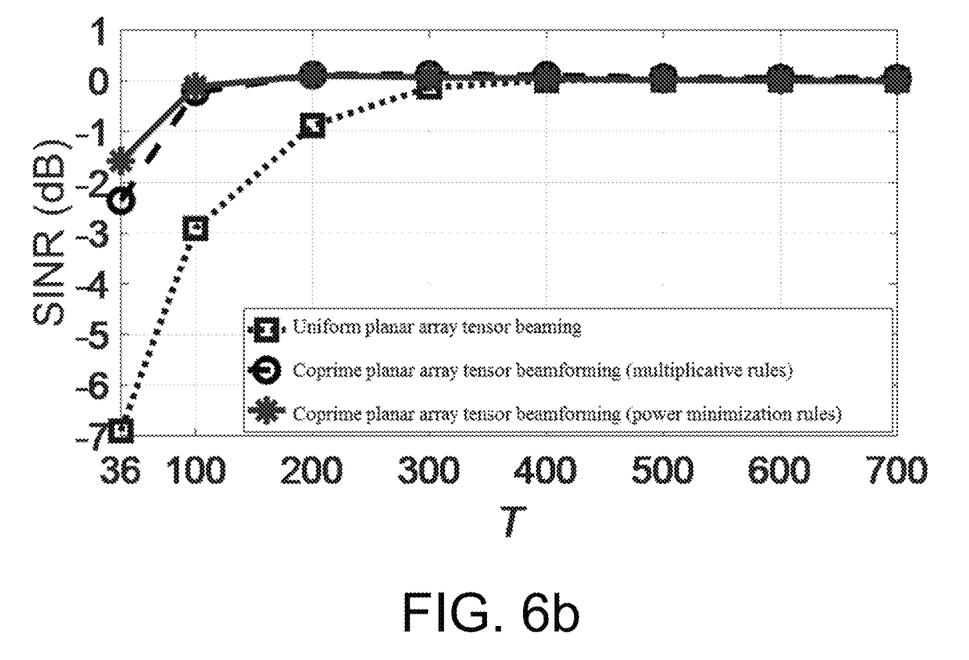
FIG. 6b is a performance comparison diagram of an output signal to noise ratio (SINR) varying with the number of snapshots of samples T.

Embodiment 2: further, the composite tensor beamforming method of the electromagnetic vector coprime planar array as proposed is compared with a signal-to-interference-plus-noise ratio (SINR) performance of the tensor signal processing method based on the electromagnetic vector uniform planar array. In order to ensure fairness of simulative comparison, 40 elements are arranged for the electromagnetic vector uniform planar array according to a structure with 5 rows and 8 columns. When the number of snapshots of the samples is T=300, a performance comparison curve of an output SINR varying with the SNR is drawn as shown in FIG. 6a. Under the condition of SNR=0 dB, a performance comparison curve of an output SINR varying with the number of snapshots of the samples T is drawn as shown in FIG. 6a. It can be seen from a comparison result of FIG. 6a and FIG. 6b that no matter in a SNR scene for different desired signals or in a different scene for the number of snapshots of samples T, the output SINR performance of the composite tensor beamforming method of the electromagnetic vector coprime planar array based on multiplicative rules and power minimization rules as proposed is superior to the tensor signal processing method based on the electromagnetic vector uniform planar array. Benefited from a big-hole-diameter advantage brought about by sparse arrangement of elements in the electromagnetic vector coprime planar array and effective function of the method in restraining the virtual peak, the electromagnetic vector coprime planar array has a higher output SINR as compared with a uniform planar array. Meanwhile, since power minimization rules restrict response of a virtual peak to a maximum extent on a tensor beam power pattern and the electromagnetic coprime planar array tensor beamforming corresponding thereto is superior to the electromagnetic vector coprime planar array tensor beamforming based on multiplicative rules.

To sum up, the present invention matches structural space information covered in the multi-dimensional receiving signal of the electromagnetic vector coprime planar array, thereby forming principles of spatial filtering of a coprime sparse uniform sub-planar array receiving signal tensor. In addition, the present invention matches the coprime arrangement feature of the two sparse uniform sub-planar arrays to perform coprime composite processing on the output signal of the sparse uniform sub-planar array by using a feature that virtual peaks do not overlap each other in the tensor beam power patterns of the two sparse uniform sub-planar arrays, so as to realize electromagnetic vector coprime planar array tensor beamforming having a capability of restraining the virtual peak and improvement of output performance.

The above are merely preferred embodiments of the present invention. Although the preferred embodiments of the present invention are disclosed above, they are not used to restrict the present invention. Any person skilled in the art who is familiar with the field can make many likely changes and modifications to the technical solution of the present invention with the method and technical contents disclosed above or modify them as equivalent embodiments of equivalent change without departing from the scope of the technical solution of the present invention. Therefore, any content without departing from the technical solution of the present invention, any simple change, equivalent change and modification made to the above embodiments according to the technical substance of the present invention, belong to the protection scope of the technical solution of the present invention.

What is claimed is:

1. A composite tensor beamforming method for an electromagnetic vector coprime planar array, comprising:
   step 1: building the electromagnetic vector coprime planar array, and receiving a signal by the electromagnetic vector coprime planar array;
   step 2: performing tensor modeling of the signal received by the electromagnetic vector coprime planar array;
   step 3: designing a three-dimensional weight tensor corresponding to a coprime sparse uniform sub-planar array;
   step 4: forming a tensor beam power pattern of the coprime sparse uniform sub-planar array; and
   step 5: performing tensor beamforming by the electromagnetic vector coprime planar array based on coprime composite processing of the sparse uniform sub-planar array, and emitting a tensor beam with the tensor beam power pattern by the electromagnetic vector coprime planar array.

2. The composite tensor beamforming method for the electromagnetic vector coprime planar array as claimed in claim 1, wherein the step 1 comprises:
   structuring a pair of sparse uniform sub-planar arrays $\bar{\theta}_a^{(\mathbb{P}_1)}, \tilde{\varphi}_a^{(\mathbb{P}_1)}{}_1$ and $\bar{\theta}_a^{(\mathbb{P}_1)}, \tilde{\varphi}_a^{(\mathbb{P}_1)}{}_2$ on a plane coordinate system xoy of a receiving end, $\bar{\theta}_a^{(\mathbb{P}_1)}, \tilde{\varphi}_a^{(\mathbb{P}_1)}{}_1$ and $\bar{\theta}_a^{(\mathbb{P}_1)}, \tilde{\varphi}_a^{(\mathbb{P}_1)}{}_2$ respectively comprising $M\mathbb{P}_1 \times N\mathbb{P}_1$ and $M\mathbb{P}_2 \times N\mathbb{P}_2$ antenna elements, wherein $M\mathbb{P}_1$, $M\mathbb{P}_2$ and $N\mathbb{P}_1$, $N\mathbb{P}_2$ are respectively a pair of coprime integers; intervals of antenna elements of the sparse uniform sub-planar array $\bar{\theta}_a^{(\mathbb{P}_1)}, \tilde{\varphi}_a^{(\mathbb{P}_1)}{}_1$ in x axis and y axis directions being respectively $M\mathbb{P}_2 d$ and $N\bar{\theta}_a^{(\mathbb{P}_1)}, \tilde{\varphi}_a^{(\mathbb{P}_1)}{}_2 d$, wherein a unit interval is d=λ/2, and λ denotes a signal wavelength;
   similarly, intervals of the antenna elements of the sparse uniform sub-planar array $\bar{\theta}_a^{(\mathbb{P}_1)}, \tilde{\varphi}_a^{(\mathbb{P}_1)}{}_2$ in the x axis and the y axis directions being respectively $M\mathbb{P}_1 d$ and $N\mathbb{P}_1 d$, wherein in $\bar{\theta}_a^{(\mathbb{P}_1)}, \tilde{\varphi}_a^{(\mathbb{P}_1)}{}_1$, positions of the $(m\mathbb{P}_1, n\mathbb{P}_1)^{th}$ antenna element in the x axis and the y axis directions are respectively $$x_{\mathbb{P}_1}^{(m_{\mathbb{P}_1})} = (m_{\mathbb{P}_1} - 1) M_{\mathbb{P}_2} d \text{ and } y_{\mathbb{P}_1}^{(n_{\mathbb{P}_1})} = (n_{\mathbb{P}_1} - 1) N_{\mathbb{P}_2} d,$$

wherein $m_{\mathbb{P}_1} = 1, 2, \ldots, M_{\mathbb{P}_1}, n_{\mathbb{P}_1} = 1, 2, \ldots, N_{\mathbb{P}_1}$; in $\mathbb{P}_2$; in $\mathbb{P}_2$.

positions of the $(m\mathbb{P}_2, n\mathbb{P}_2)^{th}$ antenna element in the x axis and the y axis directions are respectively $$x_{\mathbb{P}_2}^{(m_{\mathbb{P}_2})} = (m_{\mathbb{P}_2} - 1)M_{\mathbb{P}_1}d \text{ and } y_{\mathbb{P}_2}^{(n_{\mathbb{P}_2})} = (n_{\mathbb{P}_2} - 1)N_{\mathbb{P}_1}d,$$

wherein $m_{\mathbb{P}_2}=1, 2, \ldots, M_{\mathbb{P}_2}, n_{\mathbb{P}_2}=1, 2, \ldots, N_{\mathbb{P}_2}$; and combining sub-arrays in a manner of superimposing antenna elements ($x_{\mathbb{P}_1}^{(1)}=x_{\mathbb{P}_2}^{(1)}=\mathbb{P}_1^{(1)}=\mathbb{P}_2^{(1)}=0$) at a position of an origin point of the coordinate system for $\bar{\theta}_a^{(\mathbb{P}_1)}, \tilde{\varphi}_a^{(\mathbb{P}_1)}{}_1$ and $\bar{\theta}_a^{(\mathbb{P}_1)}, \tilde{\varphi}_a^{(\mathbb{P}_1)}{}_2$, thereby obtaining an electromagnetic vector coprime planar array actually comprising $M_{\mathbb{P}_1}N_{\mathbb{P}_1}+M_{\mathbb{P}_2}N_{\mathbb{P}_2}-1$ antenna elements, wherein each of the antenna elements uses three mutually orthogonal electric doublets and three mutually orthogonal magnetic dipoles to realize sensing of electromagnetic field, thereby possessing a six-path output.

3. The composite tensor beamforming method for the electromagnetic vector coprime planar array as claimed in claim 2, wherein the step 2 comprises:

setting a far-field narrow-band desired signal that is incident to the electromagnetic vector coprime planar array from a ($\theta$, $\varphi$) direction, wherein $\theta$ and $\varphi$ respectively denote an azimuth angle and a pitch angle of the desired signal and $\theta\in[-\pi/2, \pi/2], \varphi\in[-\pi, \pi]$; the six-path output of each of the elements in the electromagnetic vector coprime planar array simultaneously comprises Direction of Arrival (DOA) information $U(\theta, \varphi) \in \mathbb{C}^{6\times 2}$ and polarized state information $g(\gamma, \eta) \in \mathbb{C}^2$, wherein $\gamma\in[0, 2\pi]$ and $\eta\in[-\pi, \pi]$ respectively denote a polarized auxiliary angle and a polarized phase difference, and a DOA matrix $U(\theta, \varphi)$ and a polarized state vector $g(\gamma, \eta)$ are defined as:

$$U(\theta, \varphi) = \begin{bmatrix} -\sin\theta & \cos\varphi\cos\theta \\ \cos\theta & \cos\varphi\sin\theta \\ 0 & -\sin\varphi \\ \cos\varphi\cos\theta & \sin\theta \\ \cos\varphi\sin\theta & -\cos\theta \\ -\sin\varphi & 0 \end{bmatrix},$$

$$g(\gamma, \eta) = \begin{bmatrix} \cos\gamma \\ \sin\gamma e^{j\eta} \end{bmatrix}.$$

wherein $j=\sqrt{-1}$, and correspondingly, output of each of the elements in the electromagnetic vector coprime planar array is denoted with a spatial electromagnetic response vector $p \in \mathbb{C}^6$ as follows:

$$p = U(\theta,\varphi)g(\gamma,\eta);$$

when G non-relevant interfering signals exist simultaneously in a space, the DOA matrix, the polarized state vector and the spatial electromagnetic response vector thereof are respectively denoted by $\bar{U}(\bar{\theta}_g, \bar{\varphi}_g), \bar{g}(\bar{\gamma}_g, \bar{\eta}_g)$ and $\bar{p}_g = \bar{U}(\bar{\theta}_g, \bar{\varphi}_g)\bar{g}(\bar{\gamma}_g, \bar{\eta}_g)$, wherein $g=1, 2, \ldots, G$;

reserving three-dimensional spatial information of a receiving signal of the sparse uniform sub-planar array $\bar{\theta}_a^{(\mathbb{P}_1)}, \tilde{\varphi}_a^{(\mathbb{P}_1)}{}_i$ ($i=1, 2$) at time t, i.e. DOA information and spatial electromagnetic response information in the x axis direction and the y axis direction, which are denoted with one three-dimensional tensor, and superimposing a three-dimensional signal tensor snapped by the collected T sampling blocks on a time dimension as a fourth dimension, thereby constituting a receiving signal tensor $$\mathcal{X}_{\mathbb{P}_i} \in \mathbb{C}^{M_{\mathbb{P}_i} \times N_{\mathbb{P}_i} \times 6 \times T}$$

corresponding to the sparse uniform sub-planar array $\bar{\theta}_a^{(\mathbb{P}_1)}, \tilde{\varphi}_a^{(\mathbb{P}_1)}{}_i$, the receiving signal tensor $$\mathcal{X}_{\mathbb{P}_i} \in \mathbb{C}^{M_{\mathbb{P}_i} \times N_{\mathbb{P}_i} \times 6 \times T}$$

being denoted as follows:

$$\mathcal{X}_{\mathbb{P}_i} = a_x^{(\mathbb{P}_i)} \circ a_y^{(\mathbb{P}_i)} \circ p \circ s + \sum_{g=1}^{G} \bar{a}_{xg}^{(\mathbb{P}_i)} \circ \bar{a}_{yg}^{(\mathbb{P}_i)} \circ \bar{p}_g \circ \bar{s}_g + \mathcal{N}_{\mathbb{P}_i},$$

wherein $$a_x^{(\mathbb{P}_i)} = \left[1, e^{-j\frac{2\pi}{\lambda}x_{\mathbb{P}_i}^{(2)}\mu}, \ldots, e^{-j\frac{2\pi}{\lambda}x_{\mathbb{P}_i}^{(M_{\mathbb{P}_i})}\mu}\right]^T \in \mathbb{C}^{M_{\mathbb{P}_i}}$$

and $$a_y^{(\mathbb{P}_i)} = \left[1, e^{-j\frac{2\pi}{\lambda}x_{\mathbb{P}_i}^{(2)}\nu}, \ldots, e^{-j\frac{2\pi}{\lambda}x_{\mathbb{P}_i}^{(N_{\mathbb{P}_i})}\nu}\right]^T \in \mathbb{C}^{N_{\mathbb{P}_i}}$$

respectively denote a desired signal guiding vector of the electromagnetic vector coprime planar array in the x axis and the y axis directions, and $\mu=\sin\varphi\cos\theta$ and $\nu=\sin\varphi\sin\theta$, $s=[s(1), s(2), \ldots, s(T)]^T \in \mathbb{C}^T$ is a signal waveform of the desired signal, $\circ$ denotes an outer product of vectors, $(\cdot)^T$ denotes a transposition operation, and $$\mathcal{N}_{\mathbb{P}_i} \in \mathbb{C}^{M_{\mathbb{P}_i} \times N_{\mathbb{P}_i} \times 6 \times T}$$

is an independent co-distributed additive white Gaussian noise tensor; and then $$\bar{a}_{xg}^{(\mathbb{P}_i)} \in \mathbb{C}^{M_{\mathbb{P}_i}} \text{ and } \bar{a}_{yg}^{(\mathbb{P}_i)} \in \mathbb{C}^{N_{\mathbb{P}_i}}$$

respectively denote guiding vectors of the electromagnetic vector coprime planar array in the x axis and the y axis directions, corresponding to the $g^{th}$ interfering signal, and $\bar{s}_g \in \mathbb{C}^T$ denotes a signal waveform of the $g^{th}$ interfering signal.

4. The composite tensor beamforming method for the electromagnetic vector coprime planar array as claimed in claim 3, wherein the step 3 comprises:

for a receiving signal tensor $$\mathcal{X}_{\mathbb{P}_i}(t) \in \mathbb{C}^{M_{\mathbb{P}_i} \times N_{\mathbb{P}_i} \times 6}$$

of two sparse uniform sub-planar arrays that compose the electromagnetic vector coprime planar array at the time t, setting a three-dimensional weight tensor $$\mathcal{W}_{\mathbb{P}_i} \in \mathbb{C}^{M_{\mathbb{P}_i} \times N_{\mathbb{P}_i} \times 6}$$

matching multi-dimensional structure information thereof, performing spatial filtering on $\chi \mathbb{P}_i(t)$ through $W \mathbb{P}_i$, and forming a beam directivity in the DOA corresponding to the desired signal, thereby obtaining an output signal $y \mathbb{P}_i(t)$, which is denoted as follows:

$$y \mathbb{P}_i(t) = \langle \chi \mathbb{P}_i(t), W^* \mathbb{P}_i \rangle, t=1,2,\ldots,T,$$

wherein $\langle \cdot, \cdot \rangle$ denotes an inner product of tensors, $(\cdot)^*$ denotes a conjugation operation; then minimizing an average output power of a tensor beamformer and performing optimization processing such that the DOA of the desired signal and a response corresponding to a polarized state thereof should not be distorted, thereby obtaining a tensor beamformer $W \mathbb{P}_i$ corresponding to two sparse uniform sub-planar arrays, the optimization processing expression being as follows:

$$\min_{W_{\mathbb{P}_i}} E[|y_{\mathbb{P}_i}(t)|^2]$$
$$\text{s.t.} \langle W^*_{\mathbb{P}_1}, \mathcal{A}_{\mathbb{P}_i}(\theta, \varphi, \gamma, \eta) \rangle = 1,$$

wherein $\mathcal{A}_{\mathbb{P}_i}(\theta, \varphi, \gamma, \eta) = a_x^{(\mathbb{P}_i)} \circ a_y^{(\mathbb{P}_i)} \circ p \in \mathbb{C}^{M_{\mathbb{P}_i} \times N_{\mathbb{P}_i} \times 6}$ denotes a three-dimensional space manifold tensor of the sparse uniform sub-planar array $\tilde{\theta}_a^{(\mathbb{P}_1)}, \tilde{\varphi}_a^{(\mathbb{P}_1)}{}_i$ corresponding to a DOA $(\theta, \varphi)$ and a polarized state $(\gamma, \eta)$ of a desired signal, $|\cdot|$ denotes a modulo operation of complex number, and $E[\cdot]$ denotes an expectation-taking operation; through solving, three-dimensional weight tensors $W \mathbb{P}_1$ and $W \mathbb{P}_2$ respectively corresponding to sparse uniform sub-planar arrays $\tilde{\theta}_a^{(\mathbb{P}_1)}, \tilde{\varphi}_a^{(\mathbb{P}_1)}{}_1$ and $\tilde{\theta}_a^{(\mathbb{P}_1)}, \tilde{\varphi}_a^{(\mathbb{P}_1)}{}_2$ are obtained and output signals $y \mathbb{P}_1(t)$ and $y \mathbb{P}_2(t)$ are generated;

wherein each space dimension information of the three-dimensional weight tensors $W \mathbb{P}_i$ and $\chi \mathbb{P}_i(t)$ corresponds to each other, $W_i$ decomposed in a manner of CANDECOMP/PARAFAC is denoted as an outer product of a beamforming weight vector corresponding to DOA information $$w_1^{(\mathbb{P}_i)} \in \mathbb{C}^{M_{\mathbb{P}_i}}$$

in the x axis, DOA information $$w_2^{(\mathbb{P}_i)} \in \mathbb{C}^{N_{\mathbb{P}_i}}$$

in the y axis and spatial electromagnetic response information $w_3^{(\tilde{\theta}_a^{(\mathbb{P}_1)}, \tilde{\varphi}_a^{(\mathbb{P}_1)})} \in \mathbb{C}^6$:

$$W \mathbb{P}_i = w_1^{(\tilde{\theta}_a^{(\mathbb{P}_1)}, \tilde{\varphi}_a^{(\mathbb{P}_1)})} \circ w_2^{(\tilde{\theta}_a^{(\mathbb{P}_1)}, \tilde{\varphi}_a^{(\mathbb{P}_1)})} \circ w_3^{(\tilde{\theta}_a^{(\mathbb{P}_1)}, \tilde{\varphi}_a^{(\mathbb{P}_1)})},$$

then, an output signal $y \mathbb{P}_i(t)$ of the sparse uniform sub-planar array $\tilde{\theta}_a^{(\mathbb{P}_1)}, \tilde{\varphi}_a^{(\mathbb{P}_1)}{}_i$ at the time t can be denoted as follows:

$$y \mathbb{P}_i(t) = \chi \mathbb{P}_i(t) \times_1 w_1^{(\tilde{\theta}_a^{(\mathbb{P}_1)}, \tilde{\varphi}_a^{(\mathbb{P}_1)})*} \times_2 w_2^{(\tilde{\theta}_a^{(\mathbb{P}_1)}, \tilde{\varphi}_a^{(\mathbb{P}_1)})*} \times_3 w_3^{(\tilde{\theta}_a^{(\mathbb{P}_1)}, \tilde{\varphi}_a^{(\mathbb{P}_1)})*},$$

wherein $\times_r$ denotes an inner product of a tensor and a matrix along the $r^{th}$ dimension;

a weight tensor $W \mathbb{P}_i$ corresponding to a receiving signal tensor $\chi \mathbb{P}_i(t)$ is weighted to be equivalently denoted as multi-dimensional weight of the above three beamforming weight vector $w_r^{(\tilde{\theta}_a^{(\mathbb{P}_1)}, \tilde{\varphi}_a^{(\mathbb{P}_1)})}$, $r=1, 2, 3$, for $\chi \mathbb{P}_i(t)$, and a corresponding optimization problem can be denoted as follows:

$$w_r^{(\tilde{\theta}_a^{(\mathbb{P}_1)}, \tilde{\varphi}_a^{(\mathbb{P}_1)})\min}{}_{(r=1,2,3)} w_r^{(\tilde{\theta}_a^{(\mathbb{P}_1)}, \tilde{\varphi}_a^{(\mathbb{P}_1)})H} R_r^{(\tilde{\theta}_a^{(\mathbb{P}_1)}, \tilde{\varphi}_a^{(\mathbb{P}_1)})} w_r^{(\tilde{\theta}_a^{(\mathbb{P}_1)}, \tilde{\varphi}_a^{(\mathbb{P}_1)})}{}_{s.t. w_1}$$
$$\tilde{\theta}_a^{(\mathbb{P}_1)}, \tilde{\varphi}_a^{(\mathbb{P}_1)}{}^H a_x^{(\tilde{\theta}_a^{(\mathbb{P}_1)}, \tilde{\varphi}_a^{(\mathbb{P}_1)})} = 1, w_2^{(\tilde{\theta}_a^{(\mathbb{P}_1)}, \tilde{\varphi}_a^{(\mathbb{P}_1)})H} a_y^{(\tilde{\theta}_a^{(\mathbb{P}_1)}, \tilde{\varphi}_a^{(\mathbb{P}_1)})} = 1, w_3^{(\tilde{\theta}_a^{(\mathbb{P}_1)}, \tilde{\varphi}_a^{(\mathbb{P}_1)})H} p = 1,$$

wherein $R_r^{(\tilde{\theta}_a^{(\mathbb{P}_1)}, \tilde{\varphi}_a^{(\mathbb{P}_1)})} = E[x_r^{(\tilde{\theta}_a^{(\mathbb{P}_1)}, \tilde{\varphi}_a^{(\mathbb{P}_1)})}(t) x_r^{(\tilde{\theta}_a^{(\mathbb{P}_1)}, \tilde{\varphi}_a^{(\mathbb{P}_1)})}(t)^H]$, $x_r^{(\tilde{\theta}_a^{(\mathbb{P}_1)}, \tilde{\varphi}_a^{(\mathbb{P}_1)})}$ denotes an output signal of the sparse uniform sub-planar array $\tilde{\theta}_a^{(\mathbb{P}_1)}, \tilde{\varphi}_a^{(\mathbb{P}_1)}{}_i$ at the $r^{th}$ dimension, and a beamforming weight vector of remaining two dimensions other than the $r^{th}$ dimension is obtained after $\chi \mathbb{P}_i(t)$ is weighted, and is denoted as follows:

$$x_1^{(\mathbb{P}_i)}(t) = \chi_{\mathbb{P}_i}(t) \times_2 w_2^{(\mathbb{P}_i)*} \times_3 w_3^{(\mathbb{P}_i)*} \in \mathbb{C}^{M_{\mathbb{P}_i}},$$
$$x_2^{(\mathbb{P}_i)}(t) = \chi_{\mathbb{P}_i}(t) \times_1 w_1^{(\mathbb{P}_i)*} \times_3 w_3^{(\mathbb{P}_i)*} \in \mathbb{C}^{N_{\mathbb{P}_i}},$$
$$x_3^{(\mathbb{P}_i)}(t) = \chi_{\mathbb{P}_i}(t) \times_1 w_1^{(\mathbb{P}_i)*} \times_2 w_2^{(\mathbb{P}_i)*} \in \mathbb{C}^6,$$

wherein $(\cdot)^H$ denotes conjugation and transposition operations, and Lagrangian multiplier method is used to solve in order six sub-optimization problems corresponding to sparse uniform sub-planar arrays $\tilde{\theta}_a^{(\mathbb{P}_1)}, \tilde{\varphi}_a^{(\mathbb{P}_1)}{}_1$ and $\tilde{\theta}_a^{(\mathbb{P}_1)}, \tilde{\varphi}_a^{(\mathbb{P}_1)}{}_2$, and their respective three beamforming weight vectors $w_r^{(\tilde{\theta}_a^{(\mathbb{P}_1)}, \tilde{\varphi}_a^{(\mathbb{P}_1)})}{}_1$ (r=1, 2, 3) and $w_r^{(\tilde{\theta}_a^{(\mathbb{P}_1)}, \tilde{\varphi}_a^{(\mathbb{P}_1)})}{}_2$ (r=1, 2, 3), with closed-form solutions thereof as follows:

$$w_1^{(\mathbb{P}_1)} = \frac{R_1^{(\mathbb{P}_1)-1} a_x^{(\mathbb{P}_1)}}{a_x^{(\mathbb{P}_1)H} R_1^{(\mathbb{P}_1)-1} a_x^{(\mathbb{P}_1)}},$$

$$w_1^{(\mathbb{P}_2)} = \frac{R_1^{(\mathbb{P}_2)-1} a_x^{(\mathbb{P}_2)}}{a_x^{(\mathbb{P}_2)H} R_1^{(\mathbb{P}_2)-1} a_x^{(\mathbb{P}_2)}},$$

$$w_2^{(\mathbb{P}_1)} = \frac{R_2^{(\mathbb{P}_1)-1} a_y^{(\mathbb{P}_1)}}{a_y^{(\mathbb{P}_1)H} R_2^{(\mathbb{P}_1)-1} a_y^{(\mathbb{P}_1)}},$$

$$w_2^{(\mathbb{P}_2)} = \frac{R_2^{(\mathbb{P}_2)-1} a_y^{(\mathbb{P}_2)}}{a_y^{(\mathbb{P}_2)H} R_2^{(\mathbb{P}_2)-1} a_y^{(\mathbb{P}_2)}},$$

$$w_3^{(\mathbb{P}_1)} = \frac{R_3^{(\mathbb{P}_1)-1} p}{p^H R_3^{(\mathbb{P}_1)-1} p},$$

$$w_3^{(\mathbb{P}_2)} = \frac{R_3^{(\mathbb{P}_2)-1} p}{p^H R_3^{(\mathbb{P}_2)-1} p}.$$

5. The composite tensor beamforming method for the electromagnetic vector coprime planar array as claimed in claim 4, wherein the step 4 comprises:

denoting the tensor beam power pattern $\mathcal{P}\,\mathbb{P}_i(\acute\theta,\acute\varphi)$ of the sparse uniform sub-planar array tensor beamformer $W\,\mathbb{P}_i$ equivalently as follows through a CANDECOMP/PARAFAC decomposition form substituted into $W\,\mathbb{P}_i$:

$$\mathcal{P}_{\mathbb{P}_i}(\acute\theta,\acute\varphi) = \left|<\mathcal{W}_{\mathbb{P}_1}^*,\mathcal{A}_{\mathbb{P}_1}(\acute\theta,\acute\varphi,\gamma,\eta)>\right|^2 =$$

$$\left|\left(a_x^{(\mathbb{P}_i)}(\acute\theta,\acute\varphi)w_1^{(\mathbb{P}_i)H}\right)\left(a_y^{(\mathbb{P}_i)}(\acute\theta,\acute\varphi)w_2^{(\mathbb{P}_i)H}\right)\left(p(\acute\theta,\acute\varphi,\gamma,\eta)w_3^{(\mathbb{P}_i)H}\right)\right|^2,$$

wherein $\acute\theta\in[-\pi/2,\pi/2]$ and $\acute\varphi\in[-\pi,\pi]$; when DOA is in a direction of a desired signal, i.e. $\acute\theta=\theta$ and $\acute\varphi=\varphi$, a tensor beam power value of $\mathcal{P}\,\mathbb{P}_i(\acute\theta,\acute\varphi)$ reaches a maximum, which is regarded as a main lobe; at a two-dimensional DOA plane, virtual peaks exist in both tensor beam power patterns $\mathcal{P}\,\mathbb{P}_1(\acute\theta,\acute\varphi)$ and $\mathcal{P}\,\mathbb{P}_2(\acute\theta,\acute\varphi)$ of sparse uniform sub-planar arrays $\bar\theta_a^{(\mathbb{P}_1)},\tilde\varphi_a^{(\mathbb{P}_1)}{}_1$ and $\bar\theta_a^{(\mathbb{P}_1)},\tilde\varphi_a^{(\mathbb{P}_1)}{}_2$ and virtual peak positions $(\tilde\theta_a{}^{(}\bar\theta_a^{(\mathbb{P}_1)},\tilde\varphi_a^{(\mathbb{P}_1)})_{1)},\tilde\varphi_a{}^{(}\bar\theta_a^{(\mathbb{P}_1)},\tilde\varphi_a^{(\mathbb{P}_1)})_{1)})$ and $(\tilde\theta_b{}^{(}\bar\theta_a^{(\mathbb{P}_1)},\tilde\varphi_a^{(\mathbb{P}_1)})_{2)},\tilde\varphi_b{}^{(}\bar\theta_a^{(\mathbb{P}_1)},\tilde\varphi_a^{(\mathbb{P}_1)})_{2)})$ respectively corresponding thereto do not overlap each other, i.e.

$$\tilde\theta_a{}^{(}\bar\theta_a^{(\mathbb{P}_1)},\tilde\varphi_a^{(\mathbb{P}_1)})_{1)}\neq\tilde\theta_b{}^{(}\bar\theta_a^{(\mathbb{P}_1)},\tilde\varphi_a^{(\mathbb{P}_1)})_{2)},$$

$$\tilde\varphi_a{}^{(}\bar\theta_a^{(\mathbb{P}_1)},\tilde\varphi_a^{(\mathbb{P}_1)})_{1)}\neq\tilde\varphi_b{}^{(}\bar\theta_a^{(\mathbb{P}_1)},\tilde\varphi_a^{(\mathbb{P}_1)})_{2)}.$$

6. The composite tensor beamforming method for the electromagnetic vector coprime planar array as claimed in claim 5, wherein the step 5 comprises:

performing coprime composite processing on output signals of two sparse uniform sub-planar arrays, the virtual peak positions of which do not overlap each other, thereby realizing virtual-peak restrained electromagnetic vector coprime planar array tensor beamforming, wherein the coprime composite processing comprises coprime composite processing based on multiplicative rules and coprime composite processing based on power minimization rules.

7. The composite tensor beamforming method for the electromagnetic vector coprime planar array as claimed in claim 6, wherein principles of the coprime composite processing based on multiplicative rules are as follows: when, in a two-dimensional DOA $(\tilde\theta_a{}^{(}\bar\theta_a^{(\mathbb{P}_1)},\tilde\varphi_a^{(\mathbb{P}_1)})_{1)},\tilde\varphi_a{}^{(}\bar\theta_a^{(\mathbb{P}_1)},\tilde\varphi_a^{(\mathbb{P}_1)})_{1)})$, a tensor beam power pattern $\mathcal{P}\,\mathbb{P}_1(\acute\theta,\acute\varphi)$ of $\bar\theta_a^{(\mathbb{P}_1)},\tilde\varphi_a^{(\mathbb{P}_1)}{}_1$ corresponds to a virtual peak, and a tensor beam power pattern $\mathcal{P}\,\mathbb{P}_2(\acute\theta,\acute\varphi)$ of $\bar\theta_a^{(\mathbb{P}_1)},\tilde\varphi_a^{(\mathbb{P}_1)}{}_2$ does not correspond to a virtual peak, thus at a position of $(\tilde\theta_a{}^{(}\bar\theta_a^{(\mathbb{P}_1)},\tilde\varphi_a^{(\mathbb{P}_1)})_{1)},\tilde\varphi_a{}^{(}\bar\theta_a^{(\mathbb{P}_1)},\tilde\varphi_a^{(\mathbb{P}_1)})_{1)})$, tensor beam power of $\mathcal{P}\,\mathbb{P}_1(\acute\theta,\acute\varphi)$ and $\mathcal{P}\,\mathbb{P}_2(\acute\theta,\acute\varphi)$ is multiplied and the virtual peak is retrained;

similarly, when, in a two-dimensional DOA $(\tilde\theta_b{}^{(}\bar\theta_a^{(\mathbb{P}_1)},\tilde\varphi_a^{(\mathbb{P}_1)})_{2)},\tilde\varphi_b{}^{(}\bar\theta_a^{(\mathbb{P}_1)},\tilde\varphi_a^{(\mathbb{P}_1)})_{2)})$, tensor beam power pattern $\mathcal{P}\,\mathbb{P}_2(\acute\theta,\acute\varphi)$ of $\bar\theta_a^{(\mathbb{P}_1)},\tilde\varphi_a^{(\mathbb{P}_1)}{}_2$ corresponds to a virtual peak, and a tensor beam power pattern $\mathcal{P}\,\mathbb{P}_1(\acute\theta,\acute\varphi)$ of $\bar\theta_a^{(\mathbb{P}_1)},\tilde\varphi_a^{(\mathbb{P}_1)}{}_1$ does not correspond to a virtual peak, tensor beam power of $\mathcal{P}\,\mathbb{P}_1(\acute\theta,\acute\varphi)$ and $\mathcal{P}\,\mathbb{P}_2(\acute\theta,\acute\varphi)$ is multiplied and the virtual peak corresponding to the position can also be restrained; and an electromagnetic vector coprime planar array output signal $y_{mul}(t)$ based on multiplicative rules is obtained by multiplying output signals $y\,\mathbb{P}_1(t)$ and $y\,\mathbb{P}_2(t)$ of sparse uniform sub-planar arrays $\bar\theta_a^{(\mathbb{P}_1)},\tilde\varphi_a^{(\mathbb{P}_1)}{}_1$ and $\bar\theta_a^{(\mathbb{P}_1)},\tilde\varphi_a^{(\mathbb{P}_1)}{}_2$ at the time t and is denoted as follows:

$$y_{mul}(t)=y\,\mathbb{P}_1(t)*y\,\mathbb{P}_2(t),$$

correspondingly, the tensor beam power pattern of the electromagnetic vector coprime planar array is an arithmetic square root of a product of tensor beam power patterns of two sparse uniform sub-planar arrays:

$$\mathcal{P}_{mul}(\acute\theta,\acute\varphi)=\sqrt{\mathcal{P}_{\mathbb{P}_1}(\acute\theta,\acute\varphi)*\mathcal{P}_{\mathbb{P}_2}(\acute\theta,\acute\varphi)}=$$

$$\sqrt{\left|<\mathcal{W}_{\mathbb{P}_1}^*,\mathcal{A}_{\mathbb{P}_1}(\acute\theta,\acute\varphi,\gamma,\eta)>*<\mathcal{W}_{\mathbb{P}_2}^*,\mathcal{A}_{\mathbb{P}_2}(\acute\theta,\acute\varphi,\gamma,\eta)>\right|}.$$

8. The composite tensor beamforming method for the electromagnetic vector coprime planar array as claimed in claim 6, wherein principles of the coprime composite processing based on power minimization rules are as follows:

in a two-dimensional DOA $(\tilde\theta_a{}^{(}\bar\theta_a^{(\mathbb{P}_1)},\tilde\varphi_a^{(\mathbb{P}_1)})_{1)},\tilde\varphi_a{}^{(}\bar\theta_a^{(\mathbb{P}_1)},\tilde\varphi_a^{(\mathbb{P}_1)})_{1)})$, a virtual peak response value $\mathcal{P}\,\mathbb{P}_1(\tilde\theta_a{}^{(}\bar\theta_a^{(\mathbb{P}_1)},\tilde\varphi_a^{(\mathbb{P}_1)})_{1)},\tilde\varphi_a{}^{(}\bar\theta_a^{(\mathbb{P}_1)},\tilde\varphi_a^{(\mathbb{P}_1)})_{1)})$ of $\mathcal{P}\,\mathbb{P}_1(\acute\theta,\acute\varphi)$ is greater than a response value $\mathcal{P}\,\mathbb{P}_2(\tilde\theta_a{}^{(}\bar\theta_a^{(\mathbb{P}_1)},\tilde\varphi_a^{(\mathbb{P}_1)})_{1)},\tilde\varphi_a{}^{(}\bar\theta_a^{(\mathbb{P}_1)},\tilde\varphi_a^{(\mathbb{P}_1)})_{1)})$ corresponding to a non-virtual peak position of $\mathcal{P}\,\mathbb{P}_2(\acute\theta,\acute\varphi)$ and the virtual peak is restrained by selecting a minimum value thereof; similarly, on $(\tilde\theta_b{}^{(}\bar\theta_a^{(\mathbb{P}_1)},\tilde\varphi_a^{(\mathbb{P}_1)})_{2)},\tilde\varphi_b{}^{(}\bar\theta_a^{(\mathbb{P}_1)},\tilde\varphi_a^{(\mathbb{P}_1)})_{2)})$, a virtual peak response value $\mathcal{P}\,\mathbb{P}_2(\tilde\theta_b{}^{(}\bar\theta_a^{(\mathbb{P}_1)},\tilde\varphi_a^{(\mathbb{P}_1)})_{2)},\tilde\varphi_b{}^{(}\bar\theta_a^{(\mathbb{P}_1)},\tilde\varphi_a^{(\mathbb{P}_1)})_{2)})$ of $\mathcal{P}\,\mathbb{P}_2(\acute\theta,\acute\varphi)$ is greater than a non-virtual peak position response value $\mathcal{P}\,\mathbb{P}_1(\tilde\theta_b{}^{(}\bar\theta_a^{(\mathbb{P}_1)},\tilde\varphi_a^{(\mathbb{P}_1)})_{2)},\tilde\varphi_b{}^{(}\bar\theta_a^{(\mathbb{P}_1)},\tilde\varphi_a^{(\mathbb{P}_1)})_{2)})$ of $\mathcal{P}\,\mathbb{P}_1(\acute\theta,\acute\varphi)$ and the virtual peak is also restrained by selecting a minimum value thereof; and an output signal $y_{min}(t)$ of the electromagnetic vector coprime planar array based on power minimization rules is obtained by conducting minimization processing on power of output signals $y\,\mathbb{P}_1(t)$ and $y\,\mathbb{P}_2(t)$ of sparse uniform sub-planar arrays $\bar\theta_a^{(\mathbb{P}_1)},\tilde\varphi_a^{(\mathbb{P}_1)}{}_1$ and $\bar\theta_a^{(\mathbb{P}_1)},\tilde\varphi_a^{(\mathbb{P}_1)}{}_2$ at the time t:

$$y_{min}(t)=\min(|y\,\mathbb{P}_1(t)|^2,|y\,\mathbb{P}_2(t)|^2),$$

wherein min (·) denotes a minimum value taking operation; and correspondingly, the tensor beam power pattern of the electromagnetic vector coprime planar array is constituted by selecting a minimum value through comparison of tensor beam power of two sparse uniform sub-planar arrays in each two-dimensional DOA:

$$\mathcal{P}_{min}(\acute\theta,\acute\varphi)=\min(|<W\,\mathbb{P}_i^*,A\,\mathbb{P}_i(\acute\theta,\acute\varphi,\gamma,\eta)>|^2).$$

\* \* \* \* \*